United States Patent
Tackett et al.

(10) Patent No.: US 6,615,111 B2
(45) Date of Patent: Sep. 2, 2003

(54) METHODS FOR AUTOMATICALLY FOCUSING THE ATTENTION OF A VIRTUAL ROBOT INTERACTING WITH USERS

(75) Inventors: Walter A. Tackett, San Francisco, CA (US); Scott S. Benson, Burlingame, CA (US)

(73) Assignee: Nativeminds, Inc., San Francisco, CA (US)

( * ) Notice: Subject to any disclaimer, the term of this patent is extended or adjusted under 35 U.S.C. 154(b) by 15 days.

(21) Appl. No.: 10/014,936

(22) Filed: Nov. 9, 2001

(65) Prior Publication Data

US 2002/0156551 A1 Oct. 24, 2002

Related U.S. Application Data

(63) Continuation of application No. 08/868,713, filed on Jun. 4, 1997, now Pat. No. 6,363,301.

(51) Int. Cl.[7] .................................................. G06F 9/44
(52) U.S. Cl. ............................ 700/246; 704/9; 706/11
(58) Field of Search ............................... 700/9, 17, 86, 700/215, 245, 246, 264; 702/182, 188; 704/9; 706/11

(56) References Cited

U.S. PATENT DOCUMENTS

| | | | |
|---|---|---|---|
| 4,696,003 A | 9/1987 | Kerr et al. ...................... 714/38 |
| 5,161,110 A | 11/1992 | Dorchak ....................... 702/182 |
| 5,384,893 A | 1/1995 | Hutchins ..................... 395/2.76 |
| 5,442,786 A | 8/1995 | Bowen ......................... 395/600 |
| 5,483,633 A | 1/1996 | Johnson ....................... 345/339 |
| 5,526,407 A | 6/1996 | Russell et al. ................. 379/89 |
| 5,553,218 A | 9/1996 | Li et al. ....................... 395/148 |
| 5,712,987 A | 1/1998 | Waits et al. .................. 395/210 |
| 5,758,323 A | 5/1998 | Case ........................... 704/278 |
| 5,768,499 A | 6/1998 | Treadway et al. ............. 714/46 |
| 5,864,844 A | 1/1999 | James et al. .................... 707/4 |
| 5,924,089 A | 7/1999 | Mocek et al. ................ 395/701 |
| 5,974,405 A | 10/1999 | McGuinness et al. .......... 706/60 |
| 5,991,897 A | 11/1999 | Perugini et al. ............... 714/27 |
| 5,995,921 A | 11/1999 | Richards et al. ................ 707/3 |
| 6,002,868 A | 12/1999 | Jenkins et al. .................. 717/1 |
| 6,025,843 A | 2/2000 | Sklar ........................... 345/356 |
| 6,028,601 A | 2/2000 | Machiraju et al. ........... 345/336 |
| 6,028,602 A | 2/2000 | Weidenfeller et al. ....... 345/340 |
| 6,041,141 A | 3/2000 | Yamamoto et al. .......... 382/231 |
| 6,052,656 A | 4/2000 | Suda et al. ..................... 704/9 |
| 6,259,969 B1 * | 7/2001 | Tackett et al. ............... 700/264 |
| 6,314,410 B1 * | 11/2001 | Tackett et al. ................ 706/11 |
| 6,363,301 B1 * | 3/2002 | Tackett et al. ............... 700/246 |

OTHER PUBLICATIONS

Sidner, Candace L.; "Plan Parsing for Intended Response Recognition in Discourse," Comput. Intell., 1985, vol. 1: pp. 1–10.

(List continued on next page.)

*Primary Examiner*—Paul P. Gordon
(74) *Attorney, Agent, or Firm*—Morrison & Foerster LLP

(57) ABSTRACT

A virtual robot (or BOT) is disclosed that interfaces and automatically interacts with users desiring to be guided or informed about certain aspects or features of the entity with which they are interacting. Several mechanisms are further disclosed that aid the effectiveness of that interaction. Mechanisms to focus the attention of the BOT on certain aspects of the interaction or communication are disclosed. These mechanisms can be made explicitly or can be performed automatically. Mechanisms are disclosed to aid the BOT to automatically learn from its interactions with users to increase the effectiveness of the interaction.

34 Claims, 16 Drawing Sheets

Microfiche Appendix Included
(4 Microfiche, 340 Pages)

OTHER PUBLICATIONS

Sidner, Candace L.; "Focusing in the Comprehension of Definite Anaphora," Reading in the Natural Language Processing, Morgan Kaufmann Publishers, Inc., pp. 363–394.

Reichman, Rachel; "Getting Computers to Talk Like You and Me," The Mit Press, 1985, pp. 21–33, 67–90, 155–166.

Grosz, et al.; "Team: An Experiment in the Design of Transportable Natural Language Interfaces," Artificial Intelligence 32, 1987, 173–243.

Cohen, Robin; "Analyzing the Structure of Argumentation Discourse," Computational Linguistics, vol. 13, No. 1–2, Jan.–Jun. 1987, pp., 11–24.

Grosz, Barbara; "The Representation and Use of Focus in a System for Understanding Dialogs," Readings in Natural Language Processing, Morgan Kaufmann, 1986, pp. 353–362.

Grosz, et al.; "Attention, Intentions, and the Structure of Discourse," Computational Linguistics, vol. 12, No. 3, Jul.–Sep. 1986, pp. 175–204.

Hirschberg, et al.; "Empirical Studies on the Disambiguation of Cue Phrases," Computational Linguistics, vol. 19, No. 3., 1993, pp. 501–530.

Kaplan, Ronald; "A General Syntactic Processor," Courant Computer Science Symposium 8, Dec. 20–21, 1971, Algorithmics Press, Inc., 1973, pp. 193–241.

Litman, et al.; "A Plan Recognition Model for Subdialogues in Conversations," Cognitive Science, vol. II, 1987, pp. 163–200.

Reichman, Rachel; "Conversational Coherency," Cognitive Science, vol. 2, 1978, pp. 283–327.

Allen, J.; *Natural Language Understanding*, The Benjamin/Cummings Publishing Co., Inc., 1995, Chapters 14, 16, 17: pp. 429–461, 503–576.

* cited by examiner

Web Interface Case (Chat Site/Virtual World Interface Case)

Figure 15

P(Features, Labels) — 1500

|   | Label 1 | Label 2 | Label 3 | Label 4 |
|---|---|---|---|---|
| A | p(A,1) | p(A,2) | p(A,3) | p(A,4) |
| B | p(B,1) | p(B,2) | p(B,3) | p(B,4) |
| C | p(C,1) | p(C,2) | p(C,3) | p(C,4) |
| D | p(D,1) | p(D,2) | p(D,3) | p(D,4) |
| E | p(E,1) | p(E,2) | p(E,3) | p(E,4) |
| F | p(F,1) | p(F,2) | p(F,3) | p(F,4) |
| G | p(G,1) | p(G,2) | p(G,3) | p(G,4) |
| H | p(H,1) | p(H,2) | p(H,3) | p(H,4) |

Features (row axis). Row sums: $\Sigma = p(f=A)$, $\Sigma = p(f=B)$, ..., $\Sigma = p(f=H)$. Column sums: $\Sigma = p(L=1)$, $\Sigma = p(L=2)$, $\Sigma = p(L=3)$, $\Sigma = p(L=4)$.

P(Labels|Features) — 1501

| p(L|f=A) = p(L,f=A) / p(f=A) {L = 1...4} |
| p(L|f=B) = p(L,f=B) / p(f=B) {L = 1...4} |
| p(L|f=C) = p(L,f=C) / p(f=C) {L = 1...4} |
| p(L|f=D) = p(L,f=D) / p(f=D) {L = 1...4} |
| p(L|f=E) = p(L,f=E) / p(f=E) {L = 1...4} |
| p(L|f=F) = p(L,f=F) / p(f=F) {L = 1...4} |
| p(L|f=G) = p(L,f=G) / p(f=G) {L = 1...4} |
| p(L|f=C) = p(L,f=C) / p(f=C) {L = 1...4} |

P(Features|Labels) — 1502

| p(F | L=1) = p(F, L=1) / p(L=1) {F = A...G} |
| p(F | L=2) = p(F, L=2) / p(L=2) {F = A...G} |
| p(F | L=3) = p(F, L=3) / p(L=3) {F = A...G} |
| p(F | L=4) = p(F, L=4) / p(L=4) {F = A...G} |

METHODS FOR AUTOMATICALLY FOCUSING THE ATTENTION OF A VIRTUAL ROBOT INTERACTING WITH USERS

This application is a continuation of patent application Ser. No. 08/868,713, filed Jun. 4, 1997 now U.S. Pat. No. 6,363,301 issued Mar. 26, 2002.

REFERENCE TO A "MICROFICHE APPENDIX"

Submitted herewith this present application (and on deposit in the United States Patent and Trademark Office) is a microfiche appendix comprising source code of a present embodiment of the present invention. There are 340 frames contained in four pages of microfiche.

BACKGROUND OF THE ART

Understanding and processing natural language, as either spoken or written by humans, has long been a goal in the field of artificial intelligence. As computers have been programmed of late to perform awe-inspiring feats, such as defeating the world's best human chess master in his game, other skills exhibited by humans are still seemingly beyond the reach of even the most powerful computers. Although a small child may not be able to play chess, that child typically has the facility to process and understand its native tongue. Computers, on the other hand, have yet to exhibit any significant level of mastery in the realm of natural language processing.

Understanding natural language requires that the recipient have both (1) linguistic knowledge of the particular language; and (2) sufficient world knowledge to carry on a meaningful discourse about a certain topic. One early attempt at simulating natural language skills included a program called ELIZA. To simply model human language skills, ELIZA matched input sentences from a human against simple input templates of keywords. An input template might, for example, take a group of related keywords and lump them together for the purposes of responding. Thus, words like "father, mother, brother, sister" might be grouped together for a response that relied on the concept of "family". Thus, with ELIZA, familiar words were recognized while the rest of the sentence was ignored and a response was generated based on the matched keywords.

Although the method for processing natural language was greatly simplified by the approach taken by ELIZA, there were several problem areas that needed to be addressed by this approach. One such problem area occurs in the situation where more than one input template matched a given input sentence. ELIZA solved this problem by associating a "rank number" for each keyword. ELIZA would then select the highest ranked word in the sentence for matching. This mechanism for resolving multiple template matches, although very easy to implement, is relatively unsophisticated in adequately capturing the semantic meaning of natural discourse.

Other, more sophisticated programs (termed "BOT"s herein) have since been developed to capture a deeper sense of a particular discourse's meaning. As these BOTs became more sophisticated, more processing work needed to be accomplished to capture an adequate world knowledge (albeit about a limited range of topics) and linguistic knowledge. One of the major drawbacks is that early BOTs were written in very specific computer languages, such as C, PASCAL and the like. Thus, in order to create BOTs, its creator would need to author in this programming language. Additionally, modification of such BOTs were just as cumbersome—any change to a BOT would need to be made to source code in a complex programming language to be subsequently recompiled.

One early solution to the ease of creation and modification included the use of "scripting" languages that allowed for the creation and modification of BOTs in a language more akin to English. In fact, ELIZA itself used "scripts" to implement input sentence template matching.

Another problem with very early BOT creation tools was managing the complexity of English language interaction. For example, there were no models in ELIZA for the state of an on-going conversation. Thus, during the course of a conversation, a human user logged on to a BOT might talking about a "mouse" in one thread of conversation where the mouse is of the mammalian type. Then, during another thread of conversation, the particular user could refer to a "mouse" of a computer peripheral type. These early BOTs found it difficult to handle the semantic shift of word meaning.

Another example is the "pronoun" problem. During the course of a lengthy conversation, a human user can use the pronoun "it" to refer to an object that has long been discussed, but not immediately. Humans typically look for other semantic clues in the conversation to correctly bind the word "it" to the object meant. Early BOTs lacked adequate features to decipher these semantic clues to glean the correct meaning.

One early attempt to resolve these problems is described in an article by Michael Mauldin entitled "CHATTERBOTs, TINYMUDs, and the Turing Test: Entering the Loebner Prize Competition". Mauldin describes "activation networks" that are networks of response nodes that are connected to other responses through weighted edges. Prior to operation, an activation network would be created or instantiated by defining a list of subject-response nodes, whereby any given subject that may be discussed by a human user would elicit a given response as defined by a node. Different, but related, subject-response nodes would be connected via edges having a pre-defined weight. Subject-response nodes would themselves carries an activation numeric value that would vary during the course of operation of the BOT. As the subject discussed by the human user matches a given subject of a node, that node's activation value would increase. Similarly, the activation value of adjacent subject-response node to that first node might also increase or decrease according to the weight given their connecting edge.

The main drawback with activation networks is their difficulty in creating and maintaining them. For example, in designing the initial network, it is difficult to accurately assign any meaningful activation values for particular nodes and the weights accorded to their edges. Additionally, it is difficult to debug such systems because any adjustment of the weights and values will have unpredictable effects later. The problem is that the numerical assignment of natural language topics is a hard task to accomplish with meaningful results.

Thus, there is a need in the art to have a means for easily creating virtual BOTs that naturally focuses the attention of the BOT to resolve inherent ambiguities of natural language that humans do so well at—without the need to assign somewhat arbitrary numerical values that have unforeseen or unintended consequences and interactions.

There is also a need to have attention-focusing mechanisms that are easily extensible and modifiable without the need for a major re-coding effort in a traditional computer programming language.

There is also a need for a virtual robot to have an automatic learning feature that allows it to learn from its interactions with users and improve its own behavior.

SUMMARY OF THE INVENTION

The present invention meets these aforementioned needs by providing a variety of mechanisms for focusing the attention of a virtual robot or BOT. These mechanisms may be either explicit, such as an actual command, provided in the script program; or the focusing mechanism may be performed automatically by the BOT itself.

In one aspect of the present invention, in an automated interface program designed to interact and communicate with users, said program executing actions when a category among a set of predefined categories is activated, a method for focusing the attention of the automated interface program, the steps of said method comprising:

defining a list of categories activatable by said program;

maintaining an attention focus list, said focus list comprising an ordered list of categories;

executing actions associated with categories that are activated;

re-ordering said attention focus list during the course of interaction, said re-ordering being dependent upon which categories were activated.

Other aspects of the focusing mechanisms, explicit or automatic, are disclosed in the below description when read in conjunction with the accompanying figures.

In another aspect of the present invention, there is disclosed a mechanism for automatic learning whereby the present system improves its own performance automatically by analyzing its interactions with users. These and others aspects and features of the present invention are also disclosed in the detailed description given below as read in conjunction with the accompanying figures.

BRIEF DESCRIPTION OF THE DRAWINGS

FIG. 15 shows the way of computing conditional probabilities of labels on features.

DETAILED DESCRIPTION OF THE INVENTION

I. Overview and General Architecture

The term "robot" is used interchangeably with "BOT" throughout the remainder of this writeup. For the purposes of this writeup, both "BOT" and "robot" refer to any program that interacts with a human user in some fashion, and should not be assumed to refer only to physically embodied robots.

Figure 1:
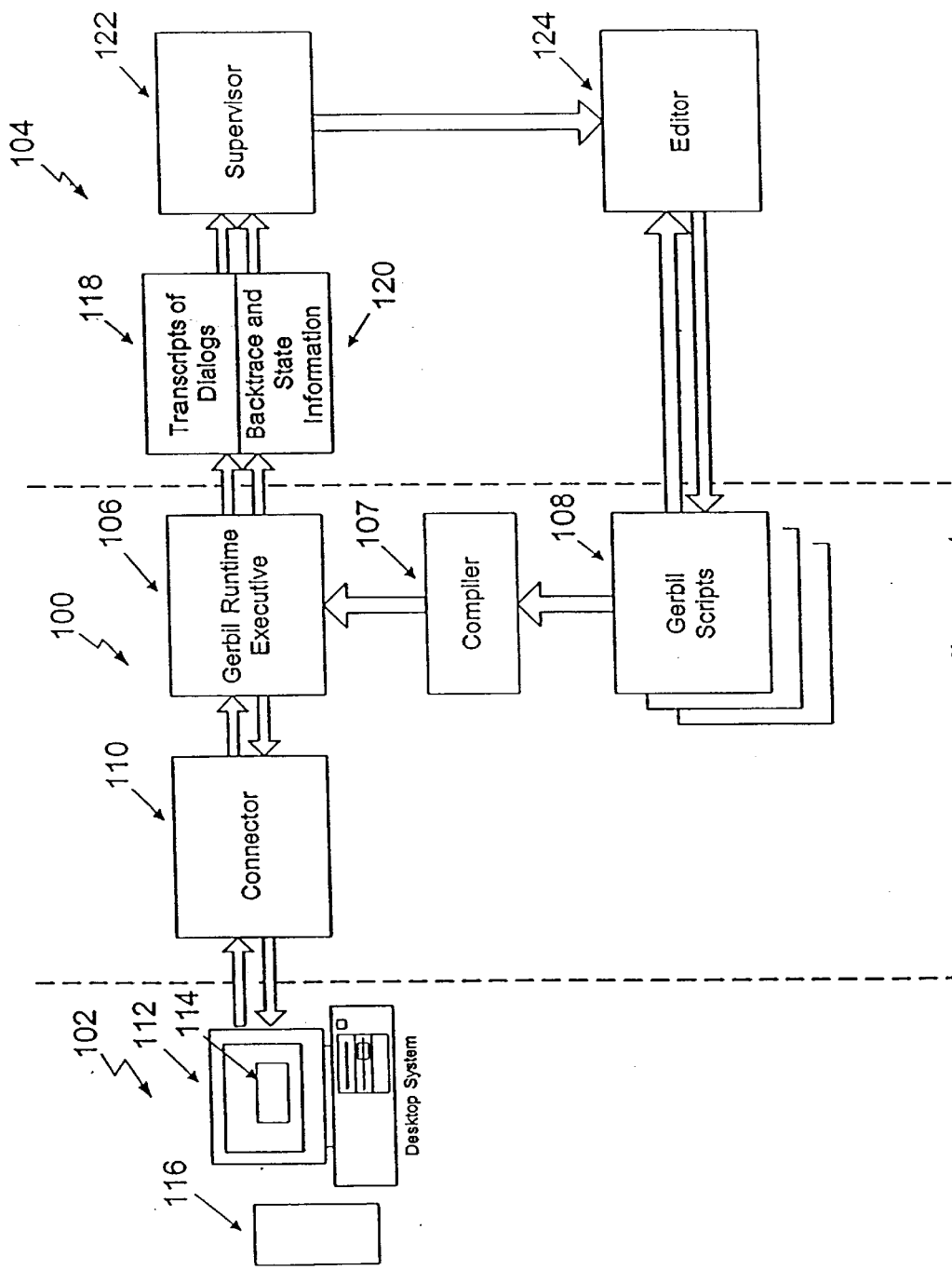
FIG. 1 depicts a suitable operating environment for the purposes of the present invention.

Referring now to FIG. 1, the operating environment of the present invention is depicted. The environment can be characterized generally into three partitions: front end 102; BOT processor 100; and back end 104. Front end 102 is generally the environment in which a human user 116 consults a virtual BOT interface 114 via a computer 112 that may be connected to the BOT processor via a communications link, such as through a server connected to the Internet or alternatively directly connected to BOT processor 100. It will be appreciated that many other means of connection to BOT processor 100 are well known to those skilled in the art and that the present invention should not be limited to any particular aspects of the general operating environment as disclosed herein.

Typically, human user 116 connects to a site whose interface of first impression is a virtual BOT interface 114. The advantage for the site developer is that human user 116 may have a help or information request that is easily handled via BOT interface 114. Today, it is not uncommon to find sites having a list of FAQs ("Frequently Asked Questions") that serve this purpose of handling very low level user concerns and questions. However, for more advanced questions or interactions with the site, virtual BOTs will become increasing popular.

In the operating environment of this embodiment of the present invention, BOT interface 114 is an instantiation of a process that is spawned by BOT processor 100 via connection 110. BOT processor 100 itself may comprise connection 110; runtime executive process 106, compiler 107, and a set of BOT programs 108. As users 116 log onto a site having BOT processor 100 via connection 110, runtime executive 106 executes an interaction routine that guides the discussion that occurs between user 116 and BOT processor 100. Typically, a two way communications dialogue occurs between user 116 and BOT processor 100 wherein user 116 may ask questions, make declarative statements and other normal communications patterns that humans typify. For the purposes of the present invention, "communications" is to be very broadly interpreted. Indeed, suitable communications could be in the form of written or spoken language, graphics, URL's or the like that may be passed to and from a user to an automatic interface program, such as the present invention.

In turn, runtime executive 106 parses the statements and questions generated by the user and responds according to a set of BOT programs 108. As will be discussed in greater detail, BOT programs 108 are typically created at the back end 104 as a set of "scripts" that the BOT processor will tend to engage in with user 116. For example, if the site using BOT processor 100 is a site for a reseller of personal computers, then BOT processor 100 should be designed to handle questions and discussions concerning personal computers and their peripherals in general. Thus, the back end 104 will generate scripts that will guide the discussion concerning many computer-related topics. These script programs 108 are then compiled by compiler 107 and the compiled code is incorporated into runtime executive 106. As will be discussed below, these scripts are written in an English-like language called "Gerbil™"—the name derived from "General Robot Builder Language" (also "GRBL"), as developed by the present assignee, Neuromedia, Inc.

As the two-way discussions between user 116 and runtime executive 106 continue, it is generally desirable to engage in quality control of BOT processor 100. This quality control is provided at back end 104 via feedback loop comprising a transcript of dialogues 118 and backtrace and state information 120 of the BOT processor 100; a supervisor 122 and editor 124. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 122 analyzes the information at 118 and 120 with an eye towards optimizing the performance of the runtime executive. Typically, supervisor 122 could be another human, deciding if the semantics captured by the system needs to be upgraded in response to a dialog transcript that has occurred. If so, supervisor 122 could optionally invoke an editor 124 to edit the Gerbil programs that represent the semantic framework of the runtime executive. These programs would then be re-comipled and incorporated into the runtime executive. As will be disclosed below, supervisor 122 could be a software program (as opposed to another human) that would automatically seek to analyze the performance of the runtime executive and make corrections to the runtime executive through the editing process.

Figure 2:
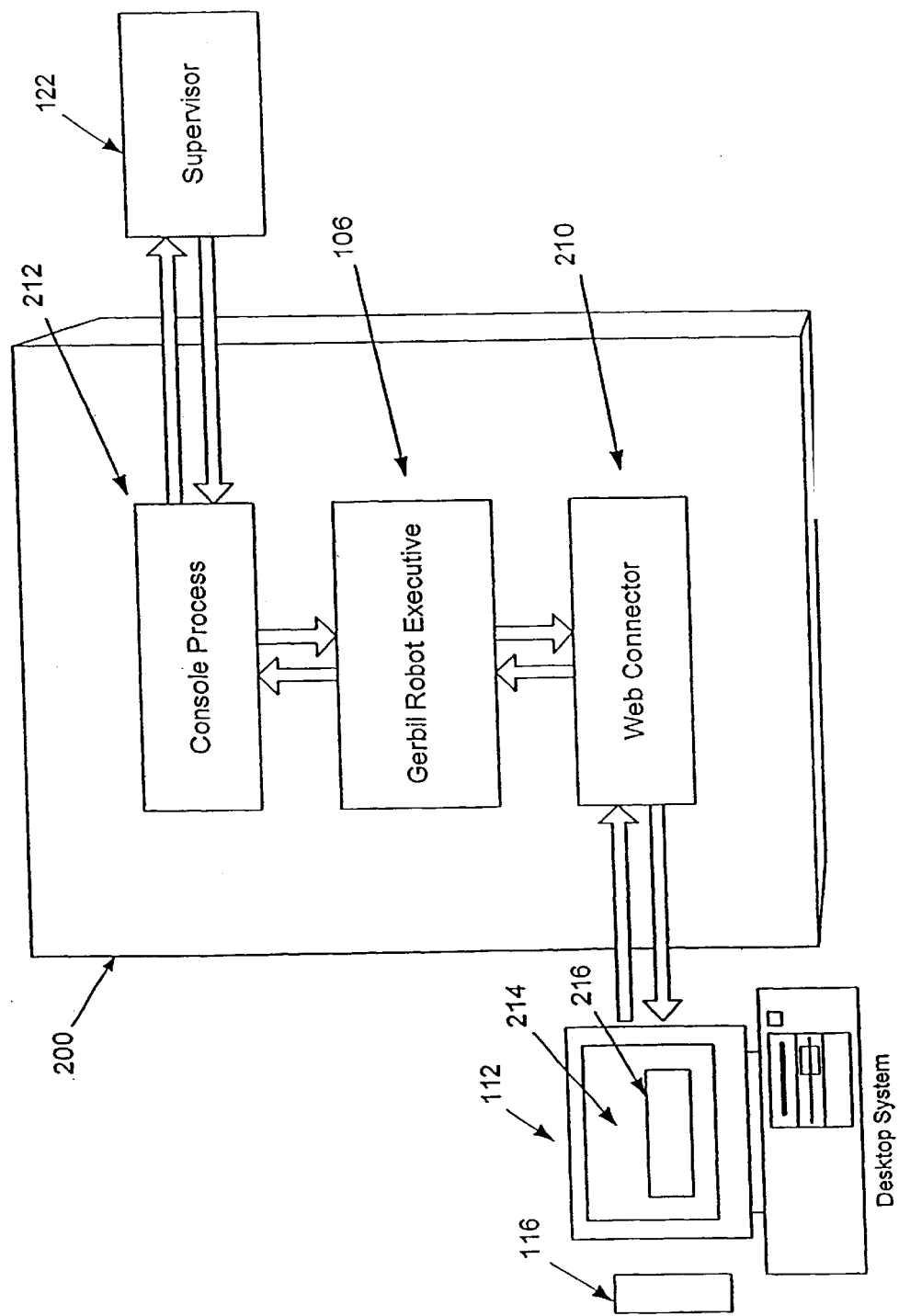
FIG. 2 depicts different operating environments for the purposes of the present invention wherein the connection to user 116 is via an intranet or internet connection.
Figure 3:
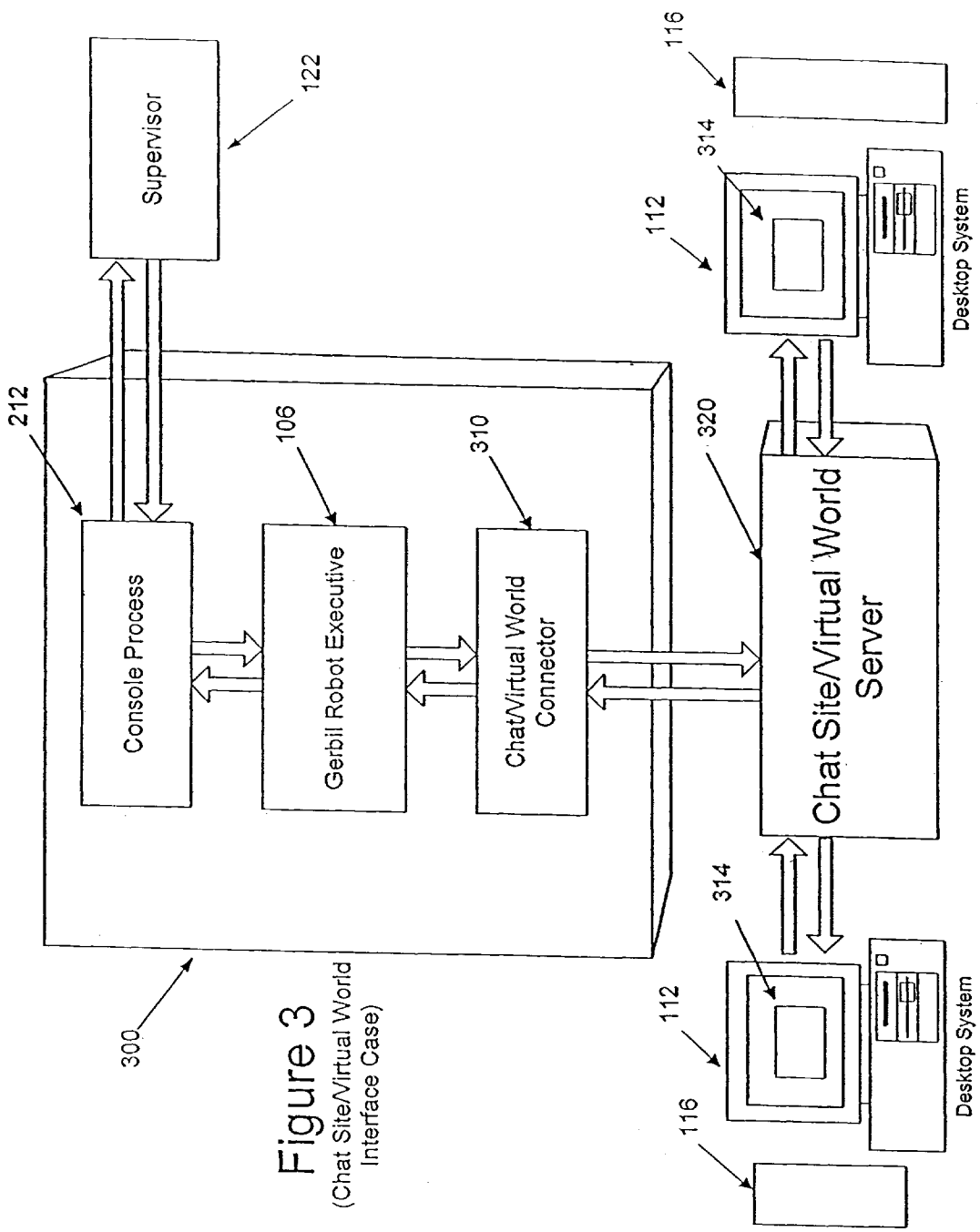
FIG. 3 depicts yet another operating environment wherein the BOT processor is merely a client of another server, such as a chat room or virtual world server.

FIGS. 2 and 3 depict slightly different operating environments for the purposes of the present invention. FIG. 2 depicts a situation wherein the BOT processor 200 connects to user 116 via an intranet or internet connection e.g. web connector 210. For example, web connector 210 may thus spawn a Java applet 216 inside of an HTML page 214 to provide the two-way communications as discussed above. It will be appreciated that such use of Java applets embedded in HTML pages is well known to those skilled in the art.

As is shown, supervisor 122 interfaces with robot executive 106 via console process 212. Console process 212 monitors the execution of robot executive 106 and may do so with a reduced set of monitoring tasks, such as merely checking to see if robot executive 106 is actively running.

FIG. 3 depicts a situation wherein the BOT processor 300 is merely a client of another server, such as a chat room or virtual world server, as depicted by server 320. BOT processor 300 is connected to server 320 via a chat/virtual world connector 310 in much the same fashion as any client would connect to a server site. Users 116 that desire to talk or converse with the BOT processor 300 interact through their client connections 314 in much the same fashion as any client-to-client communications that would be effected on server 320.

Although FIGS. 1, 2 and 3 give a general description of various operating environments in which virtual BOTs may exist, it will be appreciated that many other operating environments are obvious to those skilled in the art and that the scope of the present invention should not be so limited to the exemplary descriptions as given above.

II. Bot Processor Description

A. Script Programs and Language

As mentioned above, runtime executive 106 embodies the necessary information to maintain a reasonable conversation with human users to answer their inquiries and to carry on a general discourse with them on a set of topics. These topics are created by the back end in the form of script programs 108 that are compiled (or interpreted) and incorporated into runtime executive 106. In the preferred embodiment of the present invention, script programs may be written by human designers having little or no formal programming experience. It will be appreciated that script programs can also be written by automated learning programs or through partially automated script creation tools, and that the present invention should not be limited to human-written script programs.

Two exemplars of such script programs are given below in Table 1.

TABLE 1

TWO EXAMPLE SCRIPT PROGRAMS

EXAMPLE 1

```
Topic "CatsOrComputers" is
    IfHeard "cat","computer" then
        IfHeard "cat" then
            Say "What would you like to know about my cat?";
            Focus "Cats";
        Done
        IfHeard "computer" then
            Say "What would you like to know about my computer?";
            Focus "Computers";
        Done
    Done
EndTopic
Topic "Cats" is
    IfHeard "cat" ,"it" then
        IfHeard "mouse" then
            Say "It caught a mouse once and brought it",
                "to me as a present";
        Done
    Done
EndTopic
Topic "Computers" is
    IfHeard "computer","it" then
        IfHeard "mouse" then
            Say "The mouse is a PS/2 type mouse with three buttons";
            SwitchTo "Mouse Sales";
        Done
    Done
EndTopic
Topic "Unknown Input" is
    If ?WhatUserSaid DoesNotContain "cat","computer","mouse","it" then
        Say "Would you like to know about Cats or Computers?";
    Done
EndTopic
Sequence Topic "Mouse Sales" is
    Always
        Say "Would you like to buy one?";
        WaitForResponse;
        IfHeard "no" Then
        Done
        Say "OK, what is your name?";
        WaitForResponse;
        Remember ?UserName is ?WhatUserSaid;
        Say "That will be $199.95",
            "Please enter your credit card number now";
        WaitForResponse;
        Remember ?CardNum is ?WhatUserSaid;
```

TABLE 1-continued

TWO EXAMPLE SCRIPT PROGRAMS

```
    Say "OK, We'll mail one to you within two weeks";
       "Please give me your mailing address now.";
    WaitForResponse;
    Remember ?Address is ?WhatUserSaid;
    Done
EndTopic
Priority Topic "Swearing Filter" is
    IfHeard "fudge" Then // a popular swear word . . .
       Say "I'm sorry, that kind of language is not permitted here";
       Do "kick user off system";
    Done
EndTopic
                    EXAMPLE 2

Topic "Price of XV17" is
  Subjects "XV17", "cost";
  IfHeard "XV17", "$it" Then
    IfHeard "cost", "how much", "what about" Then
       Say "The XV17 monitor is now available for $699";
    Done
  Continue
EndTopic
Topic "Size of XV17" is
  Subjects "XV17", "features";
  IfHeard "XV17", "$it" Then
    IfHeard "size", "how big", "what about" Then
       Say "The XV17 monitor has a 17 inch full-color screen";
    Done
  Continue
EndTopic
Topic "Maker of XV17" is
  Subjects "XV17", "maker";
  IfHeard "XV17", "$it" Then
    IfHeard "who makes", "what about" Then
       Say "The XV17 monitor is made by NEC";
    Done
  Continue
EndTopic
Topic "Price of 5SG" is
  Subjects "5SG", "cost";
  IfHeard "5SG", "$it" Then
    IfHeard "cost", "how much", "what about" Then
       Say "The 5SG monitor is now available for $499";
    Done
  Continue
EndTopic
Topic "Size of 5SG" is
  Subjects "5SG", "features";
  IfHeard "5SG", "$it" Then
    IfHeard "size", "how big", "what about" Then
       Say "The 5SG monitor has a 14 inch grayscale screen";
    Done
  Continue
EndTopic
Topic "Maker of 5SG" is
  Subjects "5SG", "maker";
  IfHeard "5SG", "$it" Then
    IfHeard "who makes", "what about" Then
       Say "The 5SG monitor is made by MonitorTech";
    Done
  Continue
EndTopic
Topic "Price of 6SC" is
  Subjects "6SC", "cost";
  IfHeard "6SC", "$it" Then
    IfHeard "cost", "how much", "what about" Then
       Say "The 6SC monitor is now available for $899";
    Done
  Continue
EndTopic
```

TABLE 1-continued

TWO EXAMPLE SCRIPT PROGRAMS

```
Topic "Size of 6SC" is
  Subjects "6SC", "features";
  IfHeard "6SC", "$it" Then
    IfHeard "size", "how big", "what about" Then
       Say "The 6SC monitor has a 19 inch full-color screen";
    Done
  Continue
EndTopic
Topic "Maker of 6SC" is
  Subjects "6SC", "maker";
  IfHeard "6SC", "$it" Then
    IfHeard "who makes", "what about" Then
       Say "The 6SC monitor is made by MonitorTech";
    Done
  Continue
EndTopic
```

Considering the two script programs above, several aspects of the scripting language become apparent. First, as designed, the script language uses language primitives that are very close to human natural language. Thus, this scripting language is easy to use by users that have no facility in programming languages per se. TABLE 2 is a BNF (Backus Normal Form) description of the present embodiment of the scripting language:

TABLE 2

BNF DESCRIPTION OF THE SCRIPTING LANGUAGE WITH COMMENTS

<Program> = <Statement>*
<Statement> = <Definition> | <Category>

There are two types of statements in a program: constant definitions and input processing categories. All run-time processing of a user input is handled in the categories.
<Definition>=<PatternDef>|<PatternListDef>|<Category ListDef>
<PatternDef>=Pattern <symbol><string>;
<PatternListDef>=PatternList<symbol><string> [, <string>*];
<CategoryListDef>=<CatListType><symbol><string> [, <string>*];
<CatListType>=TopicList|ScenarioList|CategoryList;

Patterns are used to assign a name to a fixed string. The name can then be used in place of the string throughout the program, for readability and ease of modification. Similarly, a PatternList is used to assign a name to a list of strings, and a TopicList, ScenarioList, or CategoryList is used to assign a name to a list of category names (see below.)
<Category>=<Topic>|<Scenario>
<Topic>=<CategoryInfo> Topic <string> is<Tstatement>* EndTopic
<Scenario>=<CategoryInfo> Scenario <string> is <Sstatement>* EndScenario
<CategoryInfo>=[Suppressed] [Priority|Default|Sequence]

A category is either a topic or a scenario. A topic is used to process user statements, while a scenario is used to process user actions. The term "category" is used to generically refer to a topic or scenario.

Categories are divided into four types, priority, standard, default, and sequence, according to the label preceding the word "topic" or "scenario". A category that is not labeled is a Standard type. When the user makes a statement or takes an action, the categories in the program are executed, until a Done is reached (see below.) All priority categories are executed first, in the order in which they appear in the program. Next, all standard categories are executed. The order in which standard categories are executed changes dynamically depending on the execution of the program, and is described in the next paragraph. Finally, all default categories are executed, in the order in which they appear in the program. Sequence categories are executed only when explicitly accessed in a SwitchTo statement.

Standard categories are executed according to an ordered list that initially corresponds to the order in which they appear in the program. When a standard category is executed, it is moved to the front of the standard category list (and so will be executed first on the next input.) The order of the standard category list can also be changed by commands within the program, as described below.

Categories can also be temporarily suppressed, in which case they are not executed at all. If the keyword Suppressed appears in front of the category definition, it is initially suppressed. Category suppression is discussed further below.

<Tstatement>=<MemoryLock>|<SubjectList>|<Tconditional>
<Sstatement>=<MemoryLock>|<SubjectList>|<Sconditional>
<Tconditional>=<Condition>(<Command>|<Tconditional>)*<TconditionalEnd>
<Sconditional>=<Condition>(<Command>|<Sconditional>)*<SconditionalEnd>
<TconditionalEnd>=Done|Continue|NextTopic|TryAgain|SwitchBack
<SconditionalEnd>=Done|Continue|NextScenario|TryAgain|SwitchBack The body of each category is a list of conditional blocks. These conditional blocks are executed in the order found in the category. If the condition of a conditional block is false, execution goes on to the next conditional block in the category, or to the next category if there are no further conditional blocks. If the condition is true, the commands and conditional blocks inside the block are executed, and further behavior of the program is dependent on the keyword which ends the conditional block. If it ends with Done, execution ceases until the next input occurs (unless an InterruptSequence has been executed; see below.) If it ends with Continue, execution continues with the next conditional block in the category, or the next category if there are no further conditional blocks. If it ends with NextTopic/NextScenario, the rest of the current category is skipped and execution continues with the next category. If it ends with TryAgain, the most recent WaitForResponse within the block is executed (it is an error to end a block with TryAgain if it does not contain a WaitForResponse.) If it ends with SwitchBack, execution resumes immediately following whichever SwitchTo statement switched to the current block (it is an error to end a block with SwitchBack if the block is not inside a Sequence topic.)

<MemoryLock>=MemoryLock <memref>[, <memref>]*;

The top level of a category may contain one or more MemoryLock statements. Each MemoryLock statement asserts that the value of one or more associative memory elements should only be changed within that category. If an associative memory key ?x is MemoryLocked in a category C, it is an error for a program to assign a value to ?x using Remember or Forget anywhere outside the category C, or to MemoryLock ?x in some other category.

<SubjectList>=Subjects<string>[, <string>]*;

The top level of a category may contain one or more Subjects statements. Each asserts that the given subjects are subjects of the topic. If a non-IF command within the body of the topic is executed, all topics which share at least one Subject with the topic are brought to the front of the focus of attention.

```
<Condition> = If <conditionpatlist> Then |
    IfHeard <patlist> Then |
    IfHeard <pat> [and <pat>]* [and not <pat>]* |
    IfRecall <memlist> Then |
    IfRecall <memref> [and <memref>]* [and not <memref>]* |
    IfDontRecall <memlist> Then |
    IfDontRecall <memref> [and <memref>]* |
    IfChance <chance> Then |
    IfChance Then |
    Always
```

There are four fundamental types of conditions. The first three listed above are pattern matching conditions and compare some string (usually based on the user's input) to some set of template patterns, which may contain various "macro" characters, such as wildcard characters, and may have conjunctive arguments. The next four conditions test associative memory elements. An IfRecall condition is true if and only if any of its arguments has been remembered. An IfDontRecall condition is true if and only if none of its arguments have been remembered (note that the conjunctive construct "and not" is not available with IfDontRecall.) The next condition, IfChance, is either true or false at random. The frequency with which it is true depends on its argument, and possibly on other adjacend IfChance conditions. (For instance, an IfChance with no argument has the same likelihood of being true as all other argument-less IfChance statements immediately before or after it.) Finally, the Always condition is simply always true. Future versions of Gerbil will most likely also have an Otherwise condition of some sort.

```
<conditionpatlist> = <pat><matchkeyword><patlist> | <conjunction>
<matchkeyword> = <poskeyword> | <negkeyword>
<poskeyword> = Contains | Matches | ExactlyMatches
<negkeyword> = DoesNotContain |
    DoesNotMatch | DoesNotExactlyMatch
<conjunction> = <pat><matchcond> [and <matchcond>]*
    [and <conjunction>]*
<matchcond> = <poskeyword>pat [and <pat>]* [and not <pat>]* |
    <negkeyword> pat [and <pat>]*
```

The arguments of an If. Then statement are relatively complicated. They can compare an input to one of a set of patterns, or can compare it to multiple patterns using various "and" conditions. "and not" cannot be used with matching keywords that are already negated, such as DoesNotContain.

```
<Command> = Say <patlist>; | SayOneOf <patlist>; |
    Do <patlist>; | DoOneOf <patlist>; |
    Focus <catlist>; | Focus Subjects <string> [, <string>]*; |DontFocus; |
    Suppress <catlist>; | Recover <catlist>; |
    Forget <memlist>; | ForgetOneOf <memlist>; |
    Remember <assignlist>; | RememberOneOf <assignlist>; |
    WaitForResponse; | MarkResponse; | InterruptSequence; |
SwitchTo <string>; | SwitchTo <symbol>; | SwitchToOneOf <catlist>;
```

There are currently nineteen basic commands. Say makes a statement to the user, while Do takes an action of some sort. (The possible arguments of a Do action are domain-specific.) SayOneOf and DoOneOf nondeterministically select one of their arguments, and Say or Do that argument. Remember is used to assign values to associative memory elements. Forget is used to un-assign values of associative memory elements. Once Forget ?x has been executed for some element ?x, ?x will have no value and will not cause an IfRecall statement to become true, until a Remember statement is executed for ?x. ForgetOneOf and RememberOneOf are the nondeterministic equivalents of Forget and Remember. Suppress takes a list of categories as arguments and suppresses each of its argument categories so that they are no longer executed on any input. Recover takes a list of categories as arguments and reverses the effect of a Suppress command. Focus takes a list of categories as arguments and places them at the front of the ordered category list. Focus Subjects takes a list of subjects as arguments and places all categories which cover at least one of those subjects (as defined with a Subjects command in the top level of the category) at the front of the ordered category list. WaitForResponse halts execution in the same way as a Done statement but resumes at the same point on the next input. InterruptSequence can only be used within a Sequence topic, and temporarily halts execution of the current topic while all of the standard and default topics are executed. When a Done is reached, or when all of the standard and default topics are completed, execution resumes, without waiting for further input, within the Sequence topic. A SwitchTo command immediately transfers control of execution to the named category. A SwitchToOneOf command chooses one of its arguments at random and executes a SwitchTo on it. MarkResponse has no direct effect, but generates a label for use by automated testing tools.

<pat>=<string>|<symbol>|<memref>|<starbufref>|<pat>+<pat>

A pattern is anything that evaluates to a string. It can be an explicit string (indicated with quotes), the name of a Pattern object, an associative memory reference, a reference to a "star buffer element" (set according to wildcard characters appearing in template patterns within pattern matching conditional statements), or a concatenation of any of the above.

<patlist>=<pat>[, <pat>]* |<symbol>

A pattern list is anything that evaluates to a list of strings. It can be either the name of a PatternList object or a list of patterns separated by commas.

<catlist>=<catname>[, <catname>]*
<catname>=<string>|This|<symbol>

A category reference is either an explicit string containing the name of a category, the keyword This (referring to the category in which it appears) or the name of a CategoryList (or TopicList or ScenarioList) object. A category list is simply a list of categories or CategoryList objects separated by commas.

<memref>=?<symbol>|?<pat>:<symbol>
<memlist>=<memref>[, <memref>]*

A reference to the associative memory is normally indicated by a ? followed by the name of the key. Such references are normally particular to the user whose input is being processed. A reference to the associative memory for another user can be made by putting a pattern referring to the other user between the ? and the key. The reference to the other user is separated from the key by a colon. A memory reference list is simply a list of memory references separated by commas.

<assignlist>=<assignlistelem>[, <assignlistelem>]*
<assignlistelem>=<memref>|<memref>is<pat>

The arguments of a Remember action may be either single memory reference keys or combinations of keys and values. Each key-value pair results in the value being assigned to the key in the associative memory for the current user. Each single key is assigned a default value of "TRUE", which will cause the key to be recalled if used in an IfRecall conditional.

<starbufref>=*<integer>|*match

The "star buffer" contains the substring of an input string which matched each * or #* wildcard character in the template pattern in the most recent successful match. References to this star buffer consist of an asterisk (*) followed by a number. *n refers to the substring which matched the Nth wildcard character found in the template. *match refers to the substring of the input string that matched the entire template pattern.

<chance>=<realnumber>|<realnumber>%

The argument of a Chance statement is either a real number between 0 and 1, interpreted as a probability, or a real number between 0 and 100 followed by a % sign, interpreted as a probability multiplied by 100.

The second aspect of the example script programs is that the scripts themselves embody a particular universe of discourse reflective of the subject matter concerning the site itself—e.g. a BOT for a site of a reseller of personal computer should "know" something about computers and their peripherals. These script programs are written in an action-response type style wherein the actual language supplied by the user embodies an "action" to which the "response" is written into the script program itself.

Scripts in the present embodiment are written generally by site administrators (human or otherwise) by defining a list of "categories" in which the site will be well conversant. Categories may comprise "topics" that are recognizable by the runtime executive. Topics, in turn, may comprise patterns or words that are matched against the stream of input communication (in either spoken or written or any other suitable form of communication) from the user.

To embody this knowledge into the runtime executive itself, the script programs are compiled by compiler 107 in FIG. 1. As previously mentioned, these script programs may be iteratively tweaked to improve the interaction with human users by a re-edit and re-compile process. It will be appreciated that compiler techniques sufficient to implement the above-listed BNF language description are well known to those skilled in the art and that the present invention should not be limited to any particular compiler techniques.

B. Runtime Executive Process

Figure 4:
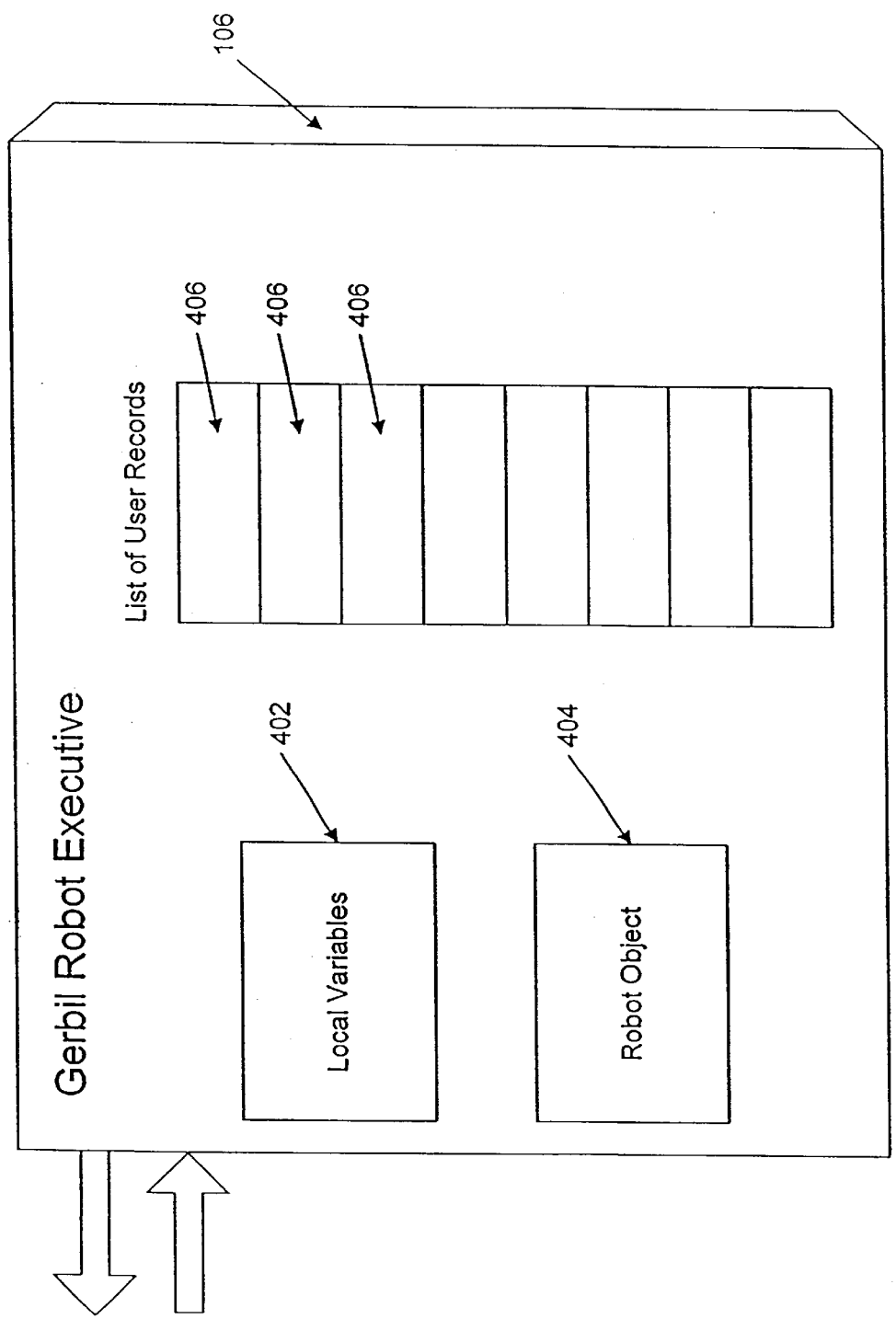
FIG. 4 expands the view of one embodiment of the runtime executive suitable for the purposes of the present invention.

FIG. 4 expands the view of runtime executive 106 of FIG. 1. Runtime executive 106 comprises local variables 402, robot object 404, and a list of user records 406. Robot object 404 is that part of runtime executive 106 that is incorporated by the compilation process described above. Although robot object 404 may be changed via the re-edit and re-compilation process as mentioned, during runtime, robot object 404 typically does not change whilst in conversation with user 116. The list of user records 406 is provided because the BOT processor could be in conversation with multiple users simultaneously and therefore needs to maintain the state of each on-going conversation. The state for each such conversation is maintained in a user record 406. Finally, runtime executive 106 maintains local variables 402 that are used during the processing of a single user input.

TABLE 3 is a listing of the C++ header file that embodies runtime executive 106.

TABLE 3

C++ HEADER FILE OF RUNTIME EXECUTIVE

```
class CProgram
{
public:
        CExeStruct*                   ProgramExecutable;
        CMatcher*                     Matcher;
        // holds all short-term run-time data
        CRunStruct*                   RunTime;
        //WAT removed OLD: CListOfSourceListings*  ProgramSourceListings;
        CGRBLToolDoc*                 OwnerSession;
        FILE*                         m_pfRSP;
        CString                       CurrentInputString;
        BOOL                          TraceMatch;
        // next 7 lines SSB 11/1/96 and on
        BOOL                          EchoOn;
        BOOL                          ReplayingLog; //so we dont try to send out
to clients.
        //User records now indexed by ID (SSB 12/17/96); we keep
        // around a map by name which is used only for reading
        // from logs. Each element is a CUserRec*
        CMapPtrToPtr                  UserRecords;
        // Index names should now be all-lower-case, SSB 2/3/97
        CMapStringToPtr               UserRecordsByName;
        // A user rec, in order to store things for the robot.
        // Actually, this has a lot of excess information,
        // such as an Attention Stack.
        // This rec may also (eventually) be in the general
        // user-list.
        // Added SSB 2/3/97
        CUserRec*                     RobotRec;
        // Run is bound to a particular session doc and view, and executes
        // either Topics or Scenarios.
        void Run(     CGRBLToolDoc*      ThisDoc,
                      CGRBLToolView*     ThisView,
                      LPCTSTR            TextLine,
                      LPCTSTR            UserName,
                      ULONG              UserID,
                      ULONG              ProtocolMessageType);
        // function which fetches the next category to be executed
        CCategory* GetNextCategory(     CGRBLToolDoc*   Context,
                                        CUserRec*       ThisUser,
                                        CCatType        ExecutionType,
                                        CABlockEnd      LastReturnVal);
        // Creation of a new user
        CUserRec* CreateNewUser(ULONG UserID, LPCTSTR UserName);
        //WAT+    DestroyUser. I like the sound of that. (opposite of CreateNewUser)
        BOOL DestroyUser(CUserRec* ThisUser);
        // Reset user to initial state (of memory and attention stack)
        void RestartUser(CUserRec* ThisUser);
        // reset the name
        BOOL ChangeUserName(LPCTSTR OldName, LPCTSTR NewName);
        // Finding of a user by name or ID
        CUserRec* FindUser(LPCTSTR UserNameOrID, BOOL CreateP);
        // Special functions are declared here . . .
        void DumpMemory(ULONG     ID);
        void PrintCurrentFocus(CUserRec* User, BOOL ShortPrint);
        // Prime the random number generator for this thread
        void PrimeTheRNG();
        // Handle the refocusing component of the program execution
        void Refocus();
        // Continuation help functions
        void SetupContinuation(CGRBLToolDoc* Context, CUserRec* ThisUser,
CContinuation* ThisContinuation);
        // Functions to Remember and Forget automatically-defined
        // attributes for the current user.
        void SetUserAttribute(LPCTSTR Key, LPCTSTR Value);
        void UnsetUserAttribute(LPCTSTR Key);
        // Useful trace function
        void PrintTraceMsg(LPCTSTR Message, LPCTSTR SourceFile, int SourceLine);
        CProgram()
        {
           TraceMatch          =FALSE;
           ReplayingLog        =FALSE;
           m_pfRSP             =NULL;
           OwnerSession        =NULL;
           ProgramExecutable   =NULL;
```

TABLE 3-continued

C++ HEADER FILE OF RUNTIME EXECUTIVE

```
        RunTime               =NULL;
        Matcher               =NULL;
        PrimeTheRNG();
    };
    ~CProgram()
    {
        //No, you DON'T want to delete the OwnerSession!!
        //delete ProgramSourceListings;
        delete ProgramExecutable;
        delete RunTime;
    };
};
```

Figure 5:
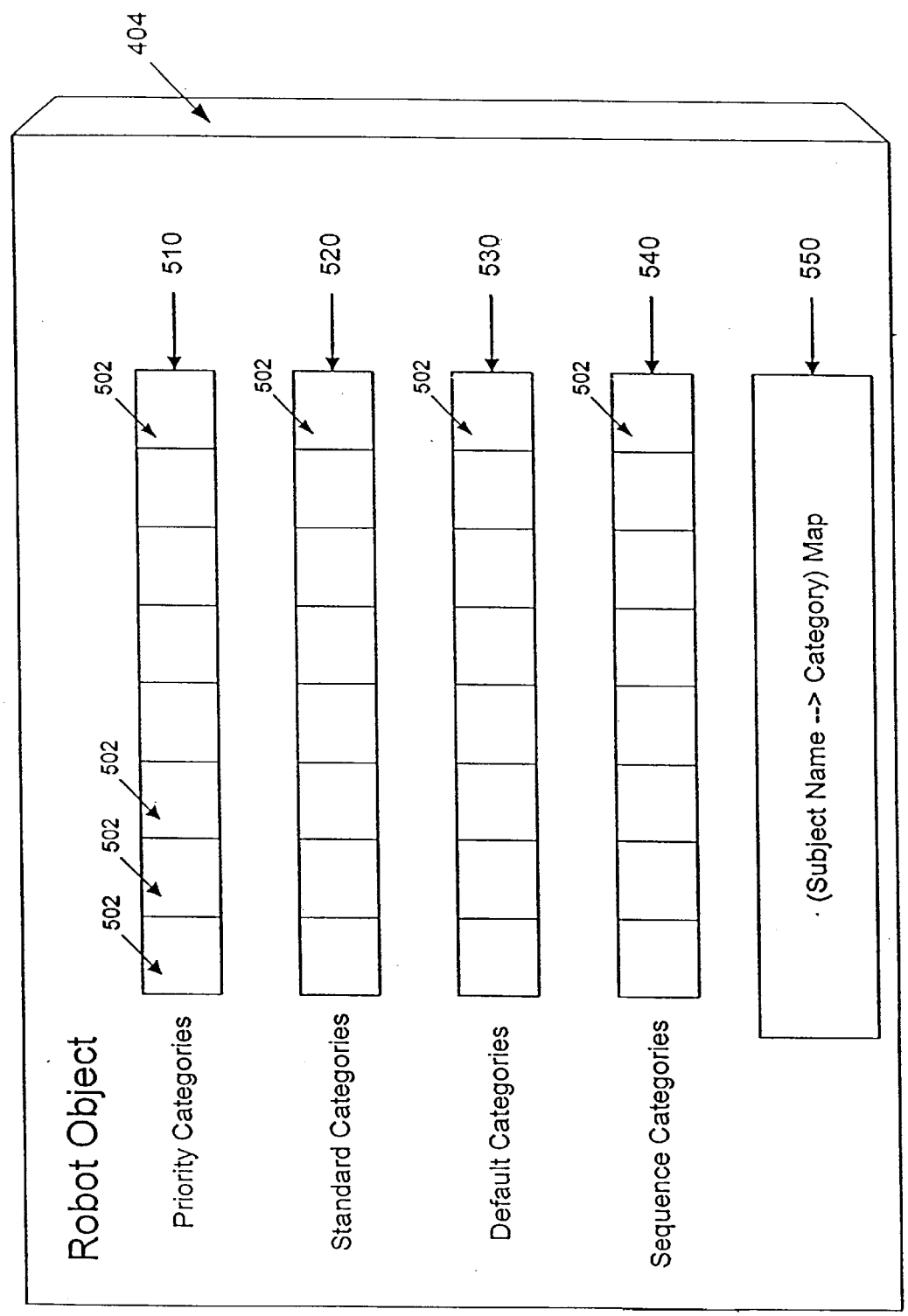
FIG. 5 expands the view of an embodiment of the robot object suitable for the purposes of the present invention.

In the code given in Table 3, robot object 404 corresponds to ProgramExecutable, which is of type CExeStruct. FIG. 5 expands the view of robot object 404 as shown in FIG. 4. Robot object 404 comprises several types of categories. These categories inherently maintain a priority by which runtime executive 106 processes inputs. For example, in FIG. 5, four types of categories are depicted: priority categories 510, standard categories 520, default categories 530, and sequence categories 540. When an input comes into the BOT processor, the input is processed through a series of categories. First, the priority categories are processed to determine whether there is a response that will be generated by the current input. These priority categories are currently processed, in the present embodiment, in the order in which they appear in the runtime executive. This order is currently selected in turn by the actual order in which PRIORITY TOPICS are found in the script program. This processing continues through the standard and default categories. Standard categories are executed in the order in which they appear in the user record for the user that is currently talking to BOT processor. Default categories are executed in the actual order in which DEFAULT TOPICS are found in the script program. Sequence categories 540 are also included in the robot object 404 but are not executed unless explicitly executed by a SWITCH-TO statement as described below. In the present embodiment, sequence categories are typically employed to perform a number of pre-defined sequential communications with a user to effect a desired result. For example, having the BOT take an order for tickets to an event, how many such tickets, credit card information to purchase such tickets, etc. is readily implemented as a sequence category. Such a sequence category would be SWITCHed-TO if prompted by a user inquiry to buy tickets.

FIG. 5 also contains subject-name to category map 550, which describes the categories associated with each subject found in a SUBJECTS command in one or more categories. This map helps to implement the Focus Subjects command, as described below.

Figure 6:
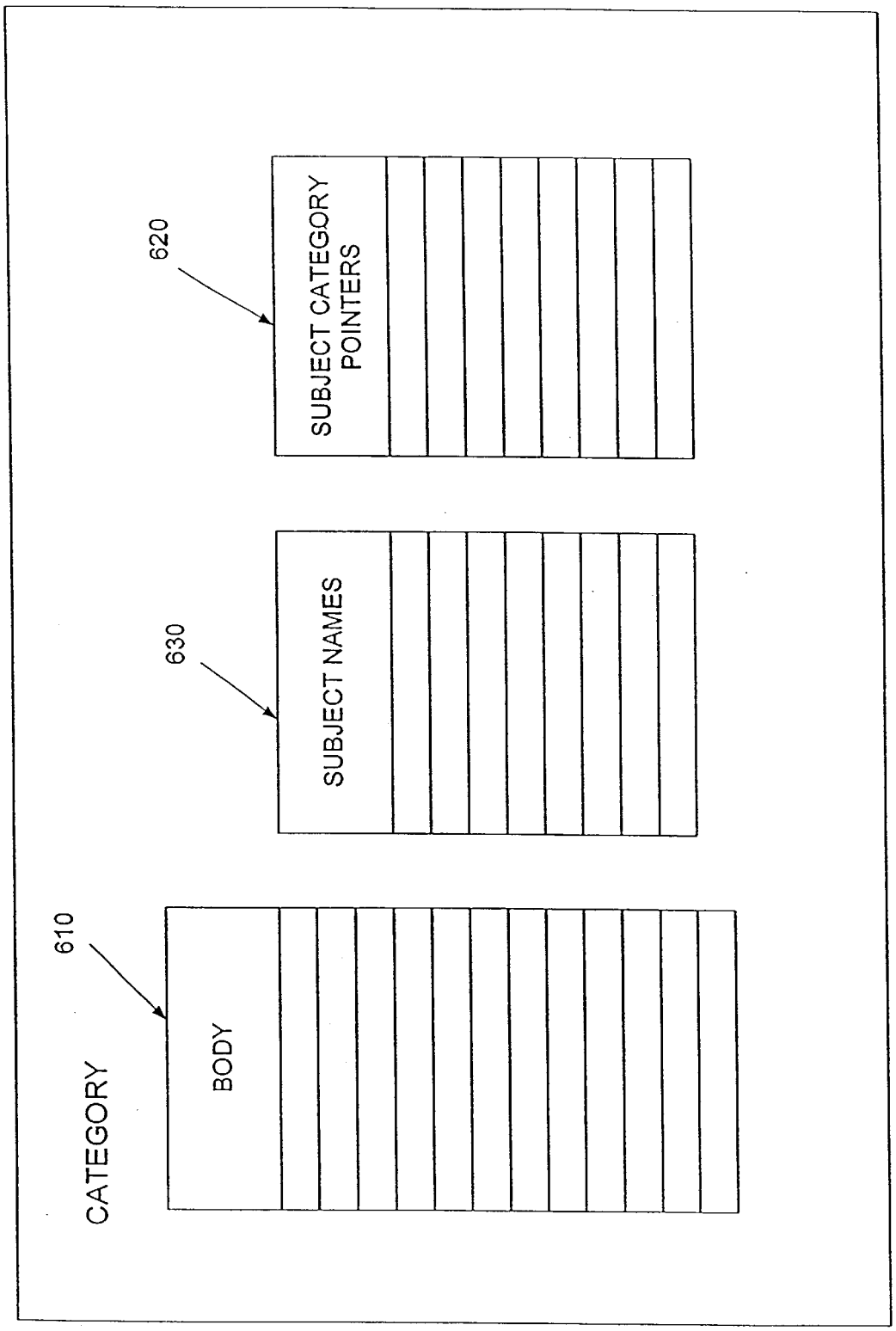
FIG. 6 describes the content of a category as embodied in a robot object.

FIG. 6 describes the content of a category 502. Category 502 comprises body 610, subject category pointers 620, and subject names 630. Body 610 is a list of pointers to condition-action blocks. Such a condition-action block is a representation of an IF-THEN block found a script program. Subject names 630 are a representation of a listing of SUBJECTS that may optionally be found in a script program. Subject category pointers 620 is list of pointers to all of the categories that share at least one SUBJECT with the category 502. As will be discussed in greater detail below, subject names 630 are used to focus the attention of the BOT processor on other categories similar to the category being processed.

Figure 7:
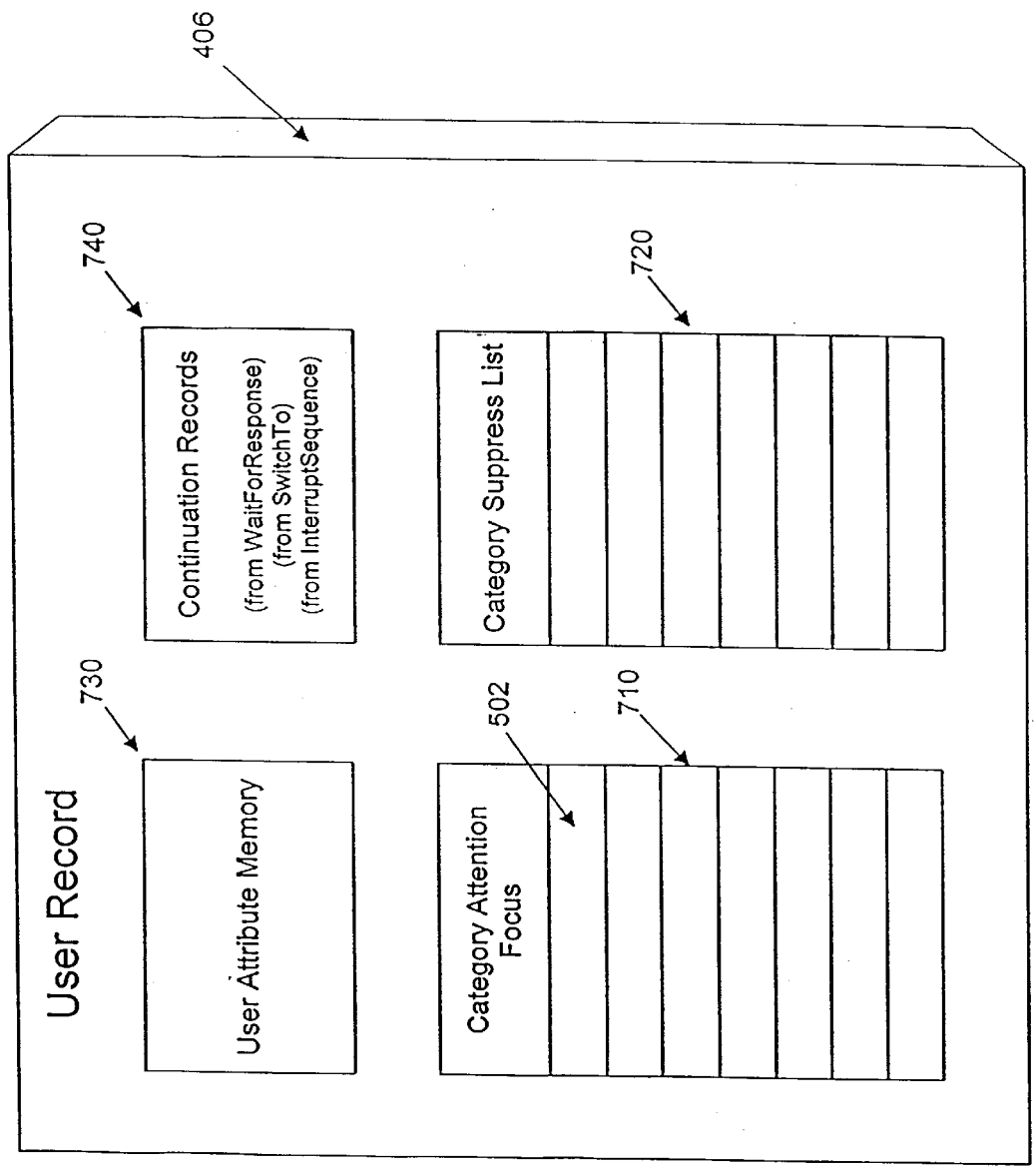
FIG. 7 expands the view of user record as shown in FIG. 4.

FIG. 7 expands the view of user record 406 as shown in FIG. 4. User record 406 comprises category attention focus list 710, category suppress list 720, user attribute memory 730, and continuation records 740. In the current embodiment of the present invention, attention focus list 710 is an ordered list comprising the standard categories 520 found in robot object 404. More generally speaking, however, an attention focus list could be implemented as a much broader list of any number of categories, as opposed to any single type of category. Indeed, for the purposes of the present invention, an attention focus list is an ordering of categories that, by virtue of their ordering, may affect the execution of an automatic interface program (i.e. BOT). It will be appreciated that all the "lists" and other structures mentioned herein could be implemented in a wide variety of well known data structuring techniques. For example, in the present embodiment, lists are implemented as CtypedPtrLists, however, lists can be readily implemented in hash tables, arrays, linked lists, or other known methods. Thus, the scope of the present invention should not be limited to specific data structure and algorithm techniques and should include all well known design and implementation variants.

The ordering of categories within the attention focus list 710 may be different for different users and reflects the state of the BOT processor's conversation with the particular user. The categories at the top of the list 710 represent areas of discourse in which the BOT processor is currently focused. In the present embodiment, when a new user begins communications with the BOT processor, the attention focus list 710 for that new user corresponds exactly to the standard categories list 520—which in turn corresponds to the order in which TOPICS are found in the script program. As conversation between the user and the BOT processor continues, this ordering of categories in attention focus list 710 is reordered according to the topics discussed by the user. The operation of the attention focus list will be discussed further in conjunction with the two examples below.

For the purposes of the present invention, the categories may be ordered according to many possible schemas. One such scheme comprises ordering categories according to a preferred execution order. As the automated interface program processes input communication from the human user, actions associated with categories of highest preferred execution order may be executed before any others. Other schemes are possible and some are disclosed in the examples given below.

Category suppress list 720 is a list of categories that have been suppressed explicitly in the script program. Suppression of categories can occur a number of ways: suppressed categories may be initially listed as suppressed in the script program or categories may be subsequently suppressed by execution of a particular action in a script program. If the user touches upon a suppressed topic, then the suppressed category is not executed by the BOT processor. This suppress feature allows the BOT creator to have greater control over the BOT's "personality" as presented to the user.

User attribute memory 730 allows the BOT processor to remember certain attributes of the user that it has learned during the course of the conversation. For example, the gender, the telephone number, the credit card number, the address of the user may be particular fields found in user attribute memory 730.

Continuation records 740 are used primarily when the BOT processor has interrupted the execution of a category and may eventually wish to resume execution of said category. Such interruptions can occur as a result of a WaitForResponse statement (in which case the BOT processor has made a query of the user and is awaiting a response), an InterruptSequence statement (in which case the BOT processor has temporarily halted processing of the current category), or a SwitchTo statement (in which case the BOT processor may eventually return to the category containing the SwitchTo statement after executing a SwitchBack command.) At such a point, continuation record 740 maintains the location of the execution of the script in memory. Once the interruption is complete, execution continues at such location. It will be appreciated that there are other times in which it is desired to store such execution state.

Figure 8:
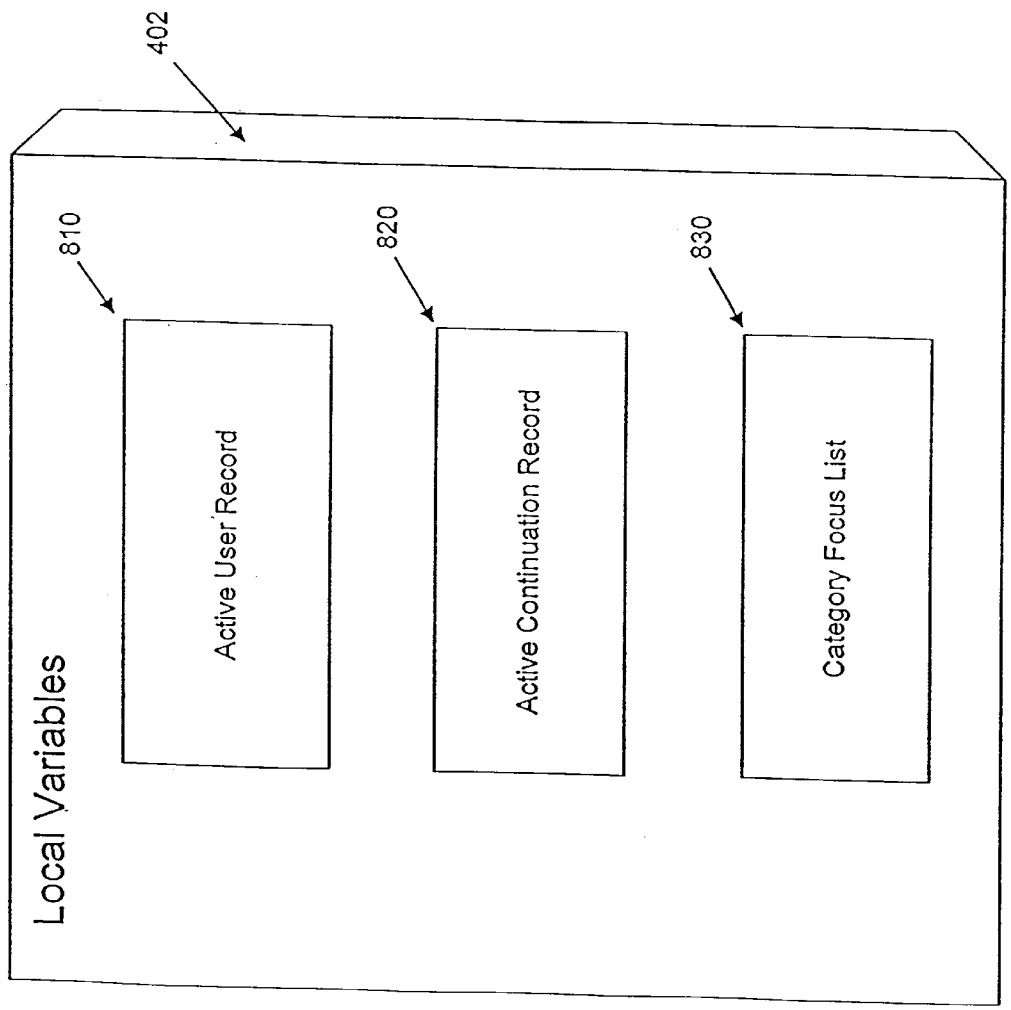
FIG. 8 expands the view of local variables as found in FIG. 4.

FIG. 8 expands the view of local variables 402 as found in FIG. 4. Local variables 402 comprise active user record 810, active continuation record 820, and category focus list 830. Active user record 810 is the user record 406 that corresponds to the user that is currently talking to the BOT processor. Active continuation record 820 is one of the continuation records 740, if any, that is copied over for the current execution. Category focus list 830 provides an intermediate store of recently activated categories and other categories associated with them. Categories are associated if they share at least one subject name as listed in 630 in FIG. 6.

C. Back-End Feature Learning From Example Inputs

Figure 9:
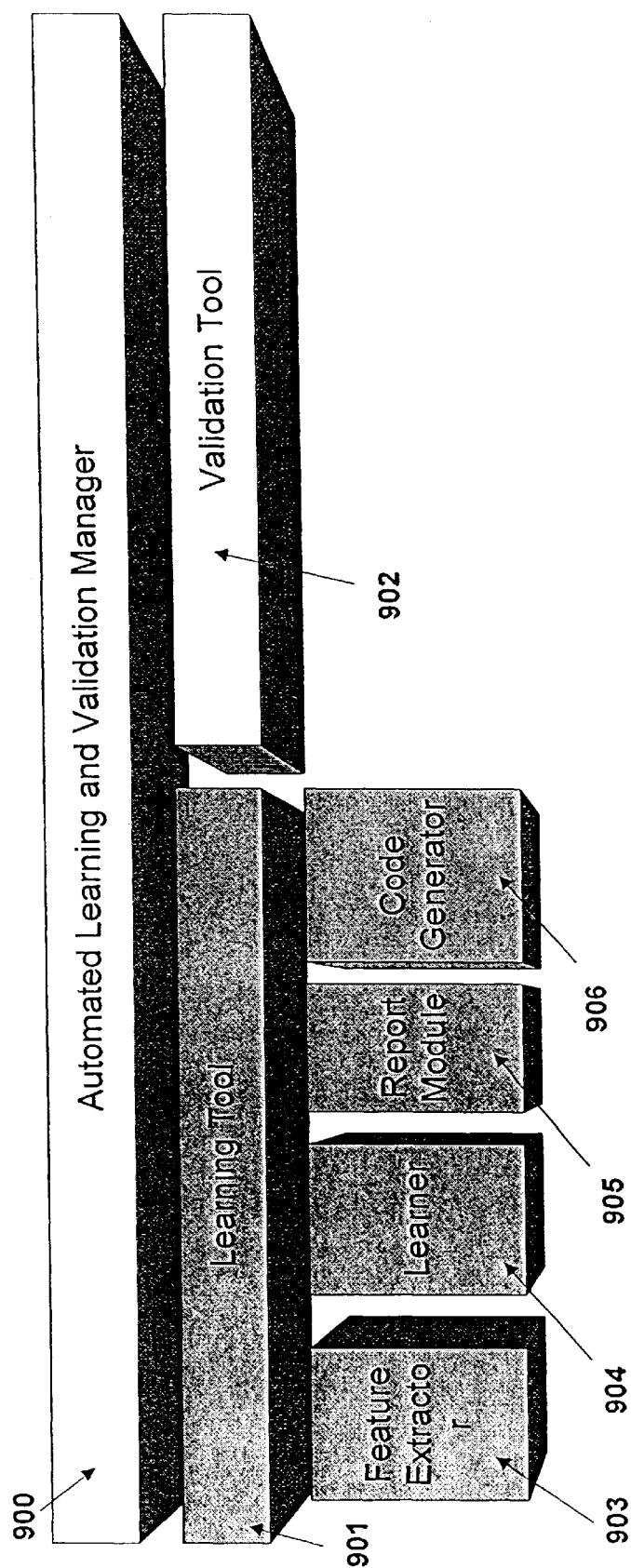
FIG. 9 shows the architecture for automatic learning of features in the context of the present embodiment of the present invention.

FIG. 9 shows the architecture for automatic learning of features in the context of the preferred embodiment of the present invention. The learning mechanism is controlled by the learning and validation manager 900, which is a user interface to present input options and summary of progress to the interactive user. It will be appreciated that mechanisms for visual presentation are well known by those skilled in the art.

Figure 10:
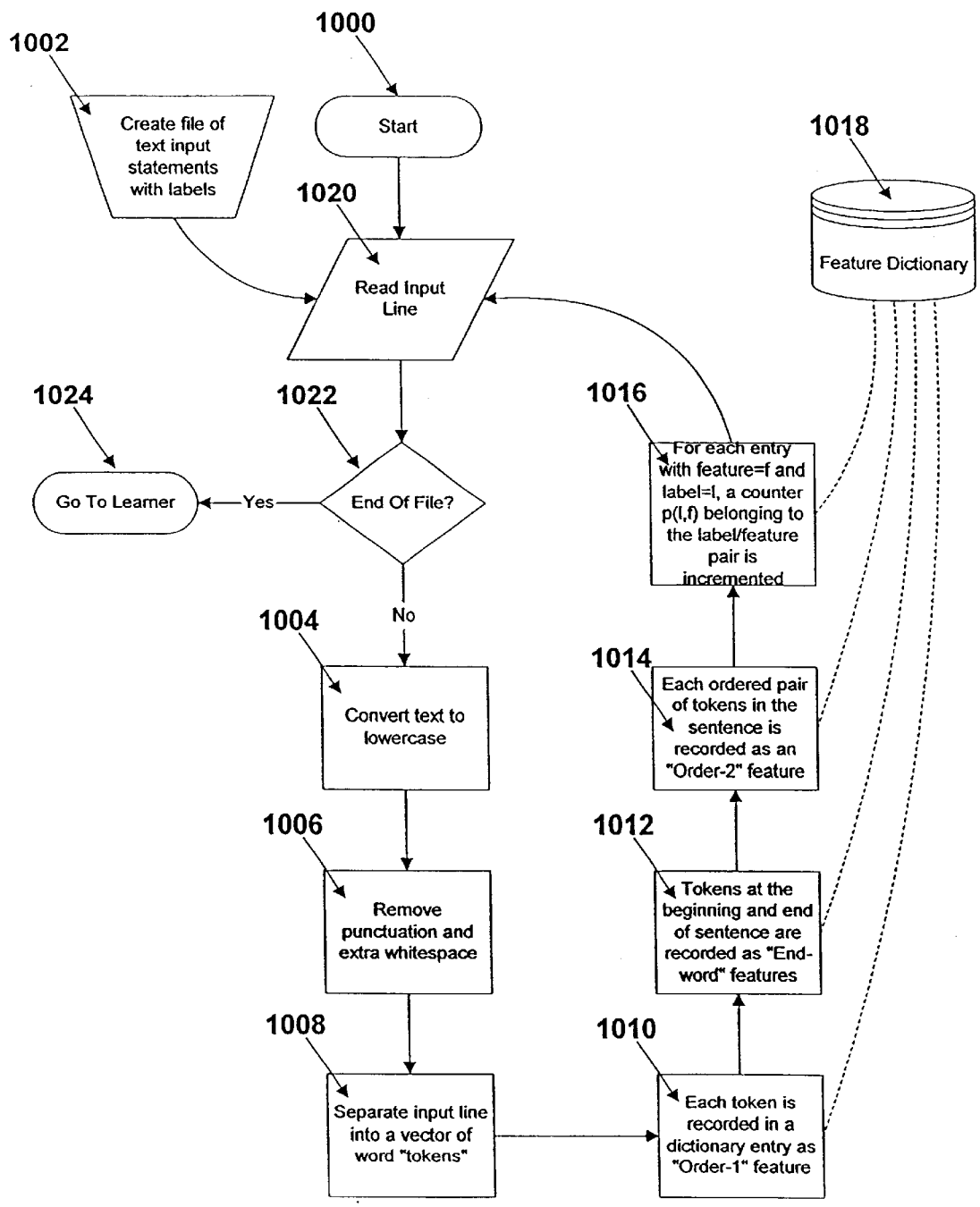
FIG. 10 shows the feature extractor of the learning mechanism.
Figure 11:
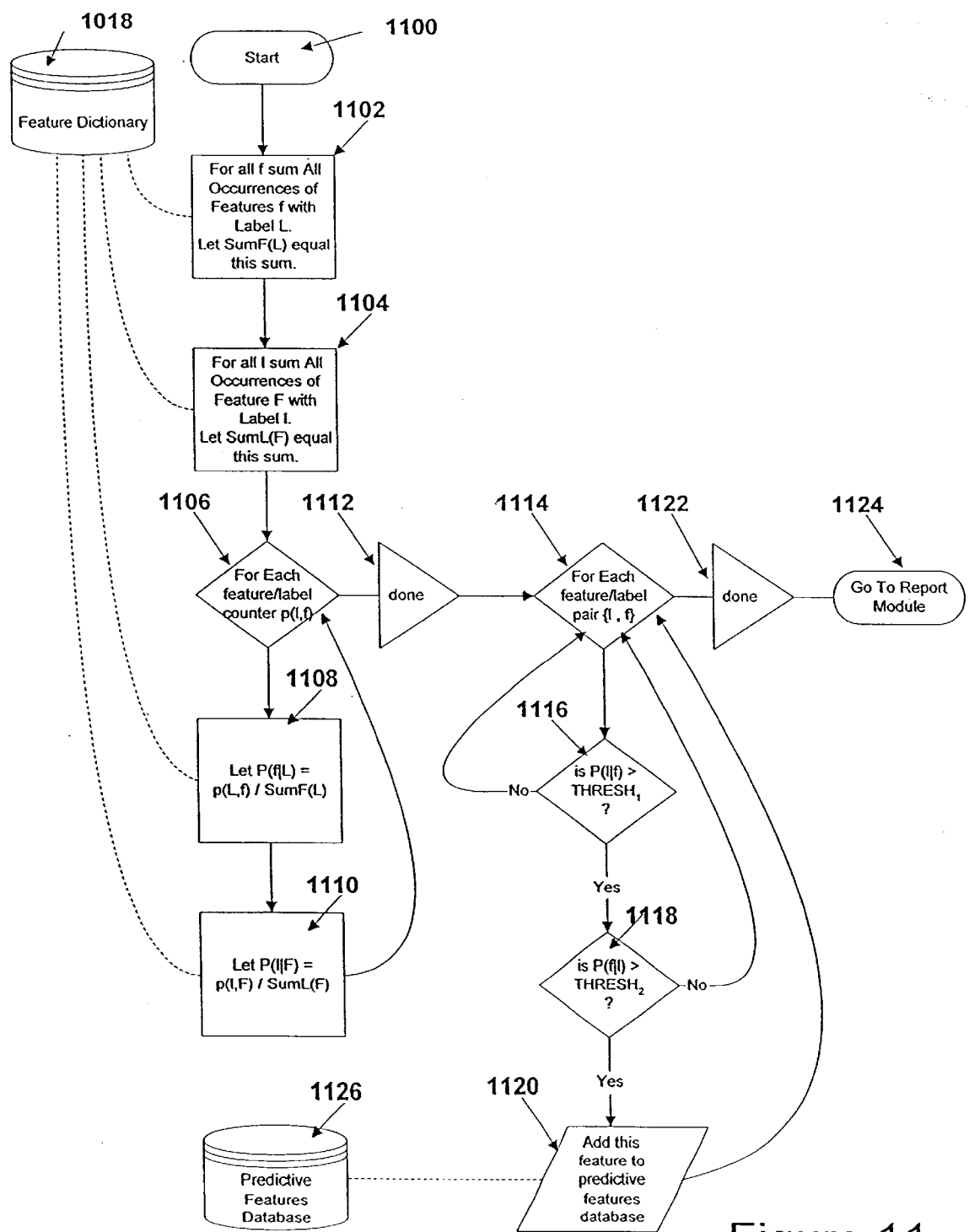
FIG. 11 shows the learner module of the learning mechanism.
Figure 12:
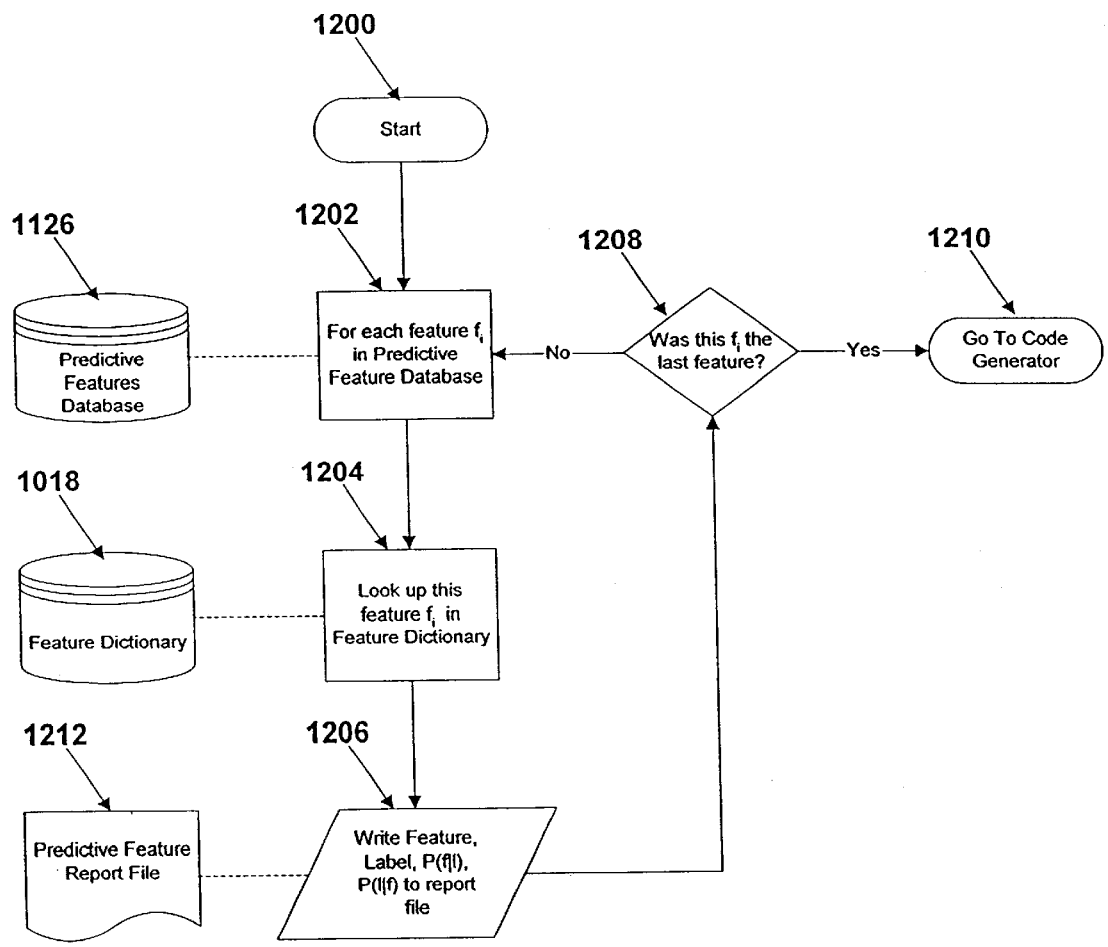
FIG. 12 shows the report module of the learning mechanism.
Figure 13:
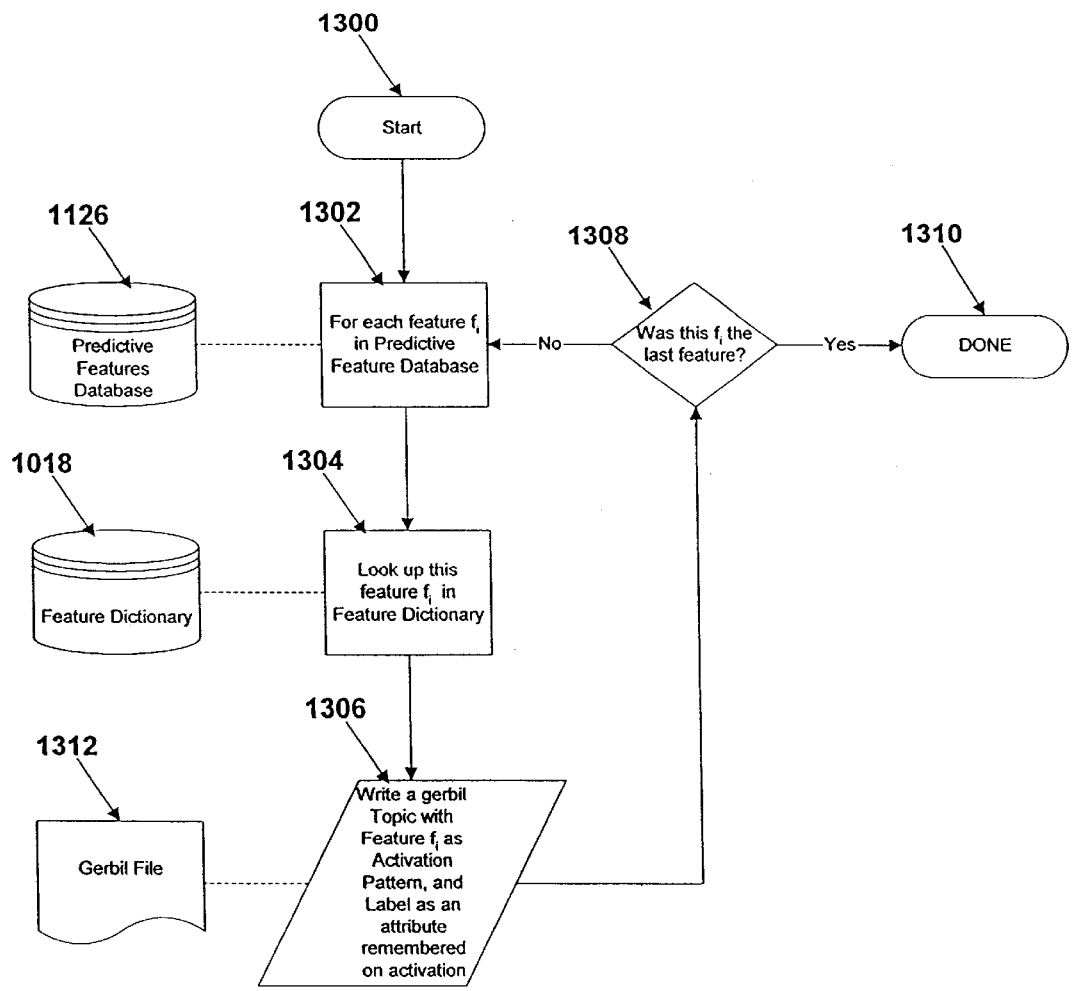
FIG. 13 shows the code generation module of the learning mechanism.

The validation manager 902 is a combination of components previously described which processes an historical sample of inputs using code created by the learning process in order to estimate and predict the quality of the automatically generated code. The Learning Tool 901 embodies one mechanism for learning Gerbil code from a set of example inputs previously categorized by a human operator. Its major components include: feature extractor 903, as shown in FIG. 10, which reduces an input sample to a set of abstract representations called features; learner 904, as shown in FIG. 11, which, given an input sample set where each input element has a label, selects a subset of the extracted features so that each feature is contained in many but not all of the input samples, creating a partition of the input sample set into those which either do or do not contain the feature, so that the label of an input sample can be predicted with some confidence based upon which members of the subset of extracted features it contains; report module 905, as shown in FIG. 12, for generating statistical and diagnostic outputs associated with the automated learning process; code generator 906, as shown in FIG. 13, which converts the subset of features selected by the learning process, along with a representation of the associated labels, into Gerbil source code, via substitution of learned features into the appropriate fields of a preexisting template. The mechanisms for creation of an instance of source code by substitution of specific fields into a template are appreciated by a practitioner of the art.

Figure 14:
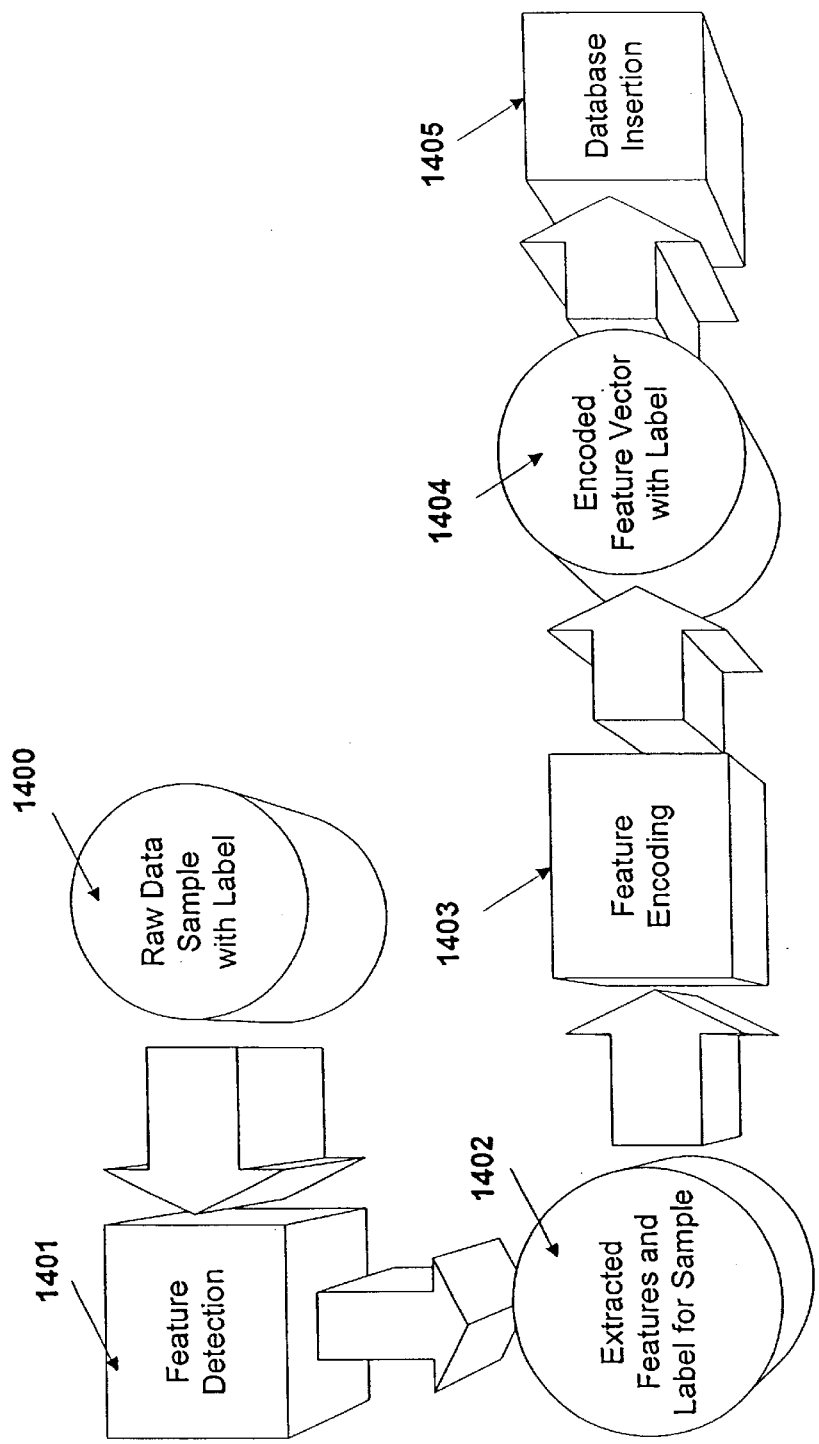
FIG. 14 shows the process of feature extraction in greater detail, following the processing of one raw data sample.

FIG. 14 shows the process of feature extraction 903 in greater detail, following the processing of one raw data sample. The flowchart FIG. 10 shows the algorithm for this process. A raw data sample 1400 can be but is not limited to a string of text, representing an action or communication from a user, which may have a label associated with it. Without loss of generality, this configuration will be used to describe the feature extraction 903 and labeling process.

The feature extraction process FIG. 10 begins at 1000, with the most basic form of input is from a user or a historical database 1002 of prior user inputs, containing only alphanumeric characters, spaces, and punctuation. The end of the input is typically delimited by a special character such as <TAB>, immediately followed by a label designating the category, character, or properties of the sample. Typically this label is assigned by a human "teacher," and has a one-to-one correspondence with the action that the teacher wishes for the robot to take in response to input of this category. The inputs are processed until reaching end-of-file 1022, at which point there is a control transfer 1024 to the learner module flowchart FIG. 11.

The extraction phase 1401, 1402 for features consists of converting the input 1400, 1020 to a standard form so that its components can be more readily stored and analyzed. Typically, this might consist of converting all characters to a uniform case 1004, and reduction of the text input to a vector of word "tokens" with all spaces and nonessential punctuation removed 1006, 1008.

Feature encoding 1403, 1404 consists of converting textual tokens to a set of symbolic codes, which denote not only the occurrence of the token 1010, but special properties it may have, such as being the leading, trailing, or only token in the input 1012, or co-occurrence with one or more tokens also contained in the current input 1014. For example, there is a unique feature assigned to the word-token "who" occurring at the beginning of a sentence. There may be a second unique feature assigned to the word "who" occurring in a sentence regardless of position, and both features will then be generated in response to one input sentence which has the word "who" at the beginning. Other entries may be formed from compound features comprising multiple words, such as "who is" or "who knows", which may occur within the same sentence frequently.

Database insertion 1405, 1010, 1012, 1014, consists of entering the encoded representations of the features into a feature dictionary, and creating statistics associated with the features. Each unique feature is isomorphic to a unique code that represents it in the feature dictionary 1018. The feature dictionary 1018 is organized so that there is only one entry for each symbolic code representing feature f and so that the occurrences and the label(s) associated with them are tabulated in the dictionary entry. In the entry for each label l there is a counter p(l,f) 1016 of the co-occurrences of label l with feature f. For the example above, if the label of the sample is "LabelType1," then the two unique codes generated will each have an entry in the feature dictionary, and each entry will have a counter associated with LabelType1 which is incremented.

After all data in the sample set have been processed, the feature dictionary 1018 contains one entry for each type of feature that was encountered in the sample set. Each entry has a count 1016 of the number of times the corresponding feature occurred in the input set. Furthermore, this count is broken down further by label for each feature, so that a unique correspondence between features and labels can be identified.

FIG. 11 shows the flowchart for the learner 904, while FIG. 15 shows the associated processing of the feature dictionary 1018 in tabular form 1500 with features represented in the rows by letters A . . . H (nominally there are thousands, rather than 8), and Label histogram for each feature represented by columns, numbered 1 . . . 4(the number of labels must be at least 2, and can easily range in the hundreds).

The algorithm for learning starts at 1100, iterating 1106, 1112, over elements of Feature Dictionary 1018. Counter elements p(f,l) 1016 for the feature dictionary 1018 table 1500 entries are just the estimated joint frequency of occurrence for each Feature-Label pair. When each entry is divided by the sum of all entries, it yields the estimated joint probability of occurrence, designated p(Feature,Label). In practice, it is an advantage to not divide through by this sum, as shown in the FIG. 11 flowchart 1102, 1104, 1108, 1110, since a large number of unnecessary and computationally expensive division operations can be avoided. Summing the columns in each row X produces an estimate of the marginal frequency with which each Feature(X) will occur, denoted p(Feature=X), or just p(X). Likewise, summing row values in each column N yields an estimate of the marginal probability that Label(N) will occur, denoted p(Label=N), or p(N). In practice, this is achieved by summing rows and columns of p(f,l) to produce the sums SumF(L) 1102, and SumL(F) 1104 p(f,l).

FIG. 15 shows the way of computing conditional probabilities of labels on features 1501. Dividing each row element p(Feature,Label) of the joint probability table by the corresponding p(Feature=X) yields the table of estimated conditional probability p(Label|Feature) that Label=N is the correct label for an input sample given that Feature=X was detected. The actual algorithm FIG. 11 divides each element p(F,l) 1016 by the sum SumL(F) 1104 to yield the conditional probability p(l|F) 1110. Note that p(Label|Feature) is the identical result p(l|F) obtained by the algorithm, since there exists a sum S so that p(Feature,Label)=p(f,l)/S for each Feature=f and Label=l, and p(Label=N)=SumL(N)/S.

FIG. 15 also shows the way of computing conditional probabilities of features on labels 1502. Dividing each column element of p(Feature,Label) by the corresponding p(Label=N) yields another table of estimated conditional probability p(Feature|Label) that Feature=X is present in an input sample given that the sample is actually of type Label=N. The algorithm FIG. 11 performs this computation by dividing p(f,L) 1016 by SumF(L) 1102 to produce p(f|L) 1108.

Figure 16:
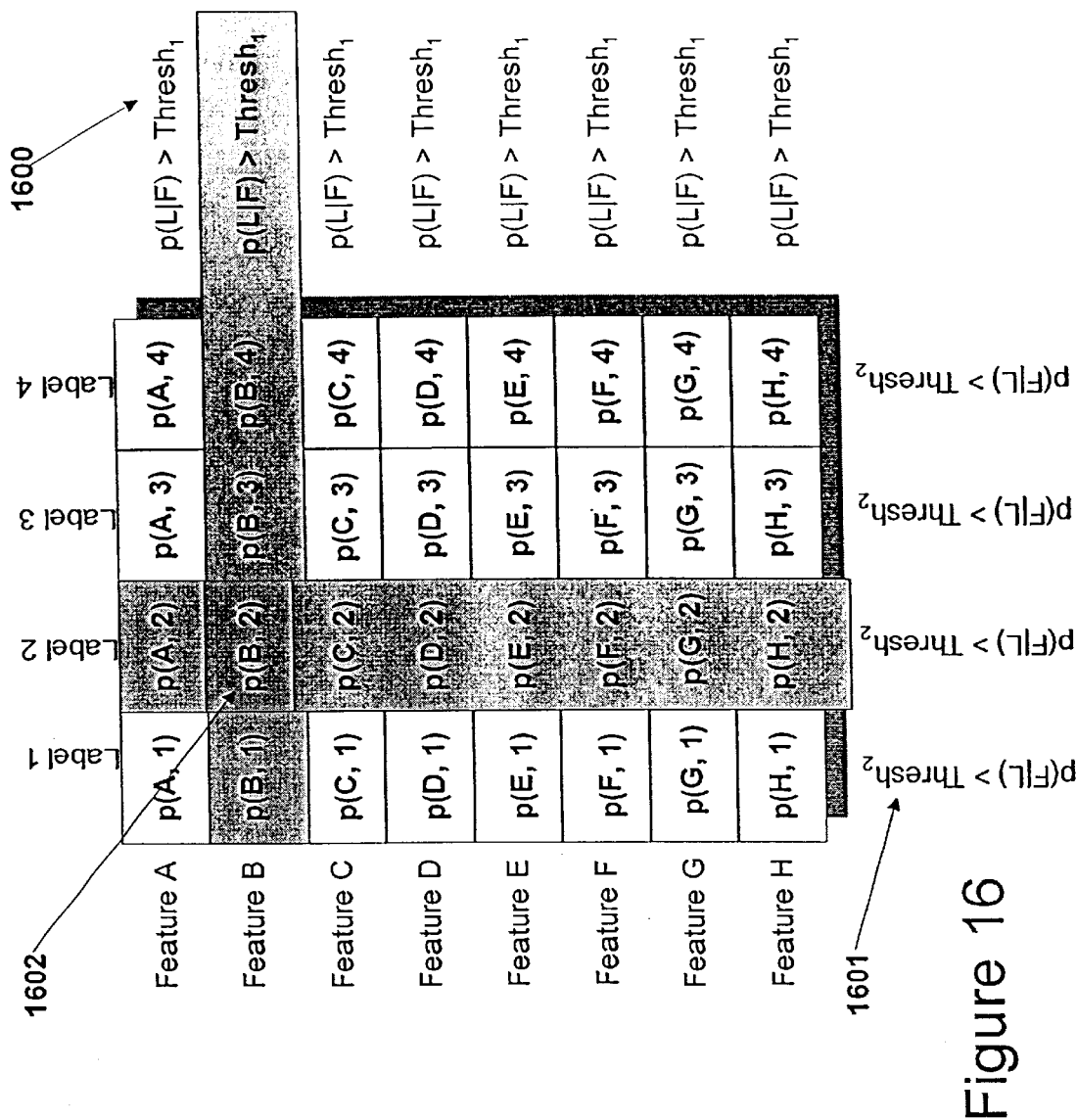
FIG. 16 depicts the data flow of the learning process.

After conditional probabilities 1108 and 1110 are computed, the algorithm Flowchart FIG. 11 iterates again 1114, 1122, over the Feature/Label pairs, to yield reliable predictive features 1126. FIG. 16 depicts the data flow of this process. Two thresholds are chosen: the "row" threshold, $Thresh_1$ 1600, 1116, and "column" threshold, $Thresh_2$ 1601, 1118.

$Thresh_1$ 1600, 1116, is set to insure that a feature is strongly predictive of a label: a Feature=X can be considered for use only if it can predict that a sample has Label=N with probability greater than or equal to $Thresh_1$ 1600, 1116. In other words, if and only if p(Label|Feature)>$Thresh_1$ 1110, 1600, 1116. Note that 1.0 is greater than or equal to p(Label|Feature) 1110, which is greater than or equal to 0.0, and $Thresh_1$ 1600, 1116 is normally in the range greater than 0.9.Since all elements p(Label|Feature=X) 1110 sum to 1.0 for a given row, then any value greater than 0.5 insures that at most one entry in a row can be considered.

$Thresh_2$ 1601, 1118 is set to insure that a feature occurs frequently enough to be of use. A Feature=X can be considered for use only if it occurs with probability greater than or equal to $Thresh_2$ 1601, 1118 when an input sample with Label=N occurs. In other words, if and only if p(Feature|Label)>$Thresh_2$ 1502, 1601, 1118. In general, no feature will reliably occur in all cases of Label=N, and so it is desirable for several diverse instances Feature=$X_i$ to surpass the threshold in order to provide adequate "coverage" so that for any given input some feature can be detected which confidently predicts Label=N.

Therefore, the detected feature set which is subsequently used to form Gerbil™ source code is a set of features that meet the criteria:

p(Label|Feature=X)>$Thresh_1$ AND p(Feature=X|Label)>$Thresh_2$

Where for a given Feature=X there is only one label satisfying both clauses of the disjunction. This union of conditions is denoted by the intersection of shaded areas 1602 in FIG. 16. All features which meet the above threshold criteria are added to the Predictive Features Database 1126. After all the features have been processed 1112, control is transferred 1124 to the Report Module 905, flowchart FIG. 12.

FIG. 12 shows how Report Module 905 iterates over the contents of Predictive Feature Database 1126 to produce an output file 1212. Upon starting 1200, the algorithm iterates 1202, 1208, over the Predictive Feature Database 1126. Each feature f in the Predictive Feature Database 1126 is looked up 1204 in the Feature Dictionary 1018, and the Label, P($f_i$|l), and P(l|$f_i$) for that entry are written 1206 to the Predictive Feature Report File 1212. Upon completion, control is transferred 1210 to Code Generator module 906 flowchart FIG. 13.

Table 4 shows a typical output file from Report Module 905 for feature extractor 903 and learner 904 run against a database of approximately 2800 labeled input sentences, with $Thresh_1$=0.9 and $Thresh_2$=0.1. The first column shows a unique serial number generated for each feature. The second column shows a representation of the corresponding feature, according to the following legend:

| Feature | Meaning |
| --- | --- |
| word1 | word occurring anywhere in input line |
| <word1 | word occurring at start of input line |
| >word1 | word occurring at end of input line |
| ^word1 | only word in input line |
| word1 word2 | word2 occurring directly after word1 in input line |
| word1*word2 | word2 occurring after word1, with 0 or more occurrences of other words between |
| word1 AND word2 | word1 and word2 occurring in input line in any order |

Inspection of the table shows that the process can be optimized to eliminate redundancy.

In column 3, the categories chosen in this example represent 10 types of questions that are being distinguished from each other. Note that many of the questions in this database were concerning the filing of taxes, and so there is a particular bias in the category of "WhatIf" questions towards words like "file" and "late." Columns 4 and 5 show the conditional probabilities being tested.

In the same way that report module 905 generates a report, the Code Generator module 906 generates corresponding GRBL source code 1312. Upon starting 1300, the algorithm iterates 1302, 1308, over the Predictive Feature Database 1126. Each feature $f_i$ in the Predictive Feature Database 1126 is looked up 1304 in the Feature Dictionary 1018, and the feature $f_i$ for that entry is written as an activation pattern, and an associative memory element isomorphic to the Label is remembered as the action corresponding to the activation, and the resulting Gerbil™ code is written 1306 to the Gerbil File 1312. An example of this is shown in Listing below. Upon completion, the execution of Learning Tool 901 is complete 1310.

The results shown in Table 4 can be used to directly generate Gerbil source code, since the features translate directly into Gerbil™ pattern matching expressions described earlier, and the labels can immediately take the form of Gerbil™ associative memory patterns. The probabilities are not directly used by the Gerbil™ code, but are included here only as an illustration of typical probability values for this algorithm.

Listing shows excerpts from a typical output file from Code Generator module 906 using results from feature extractor 903 and learner 904 run against a database of approximately 2800 labeled input sentences, with $Thresh_1$=0.9 and $Thresh_2$=0.1 (the same data shown in Table 4).

Listing shows one clause in an automatically generated Gerbil™ topic, representing the first and last entries in the table (intermediate examples are omitted for brevity):

Listing

Topic "Autogenerated Question Classifier" is
   If ?WhatUserSaid Matches "#can*#I*" Then
     Remember ?CategoryLabel is "CanYouI";
   Done
   If ?WhatUserSaid Matches "#who #are*" Then
     Remember ?CategoryLabel is "Who";
   Done
EndTopic

TABLE 4

| Serial #ID | Feature | Label | p(F\|L) | p(L\|F) |
|---|---|---|---|---|
| 3650 | <can*i | canyoui | 54.69% | 100.00% |
| 3651 | <can i | canyoui | 51.56% | 100.00% |
| 3711 | <can*get | canyoui | 18.75% | 92.31% |
| 3802 | <can*you | canyoui | 15.63% | 100.00% |
| 52 | <may | canyoui | 15.63% | 90.91% |
| 3803 | <can you | canyoui | 12.50% | 100.00% |
| 5720 | <what*is | describe | 24.68% | 91.77% |
| 5721 | <what is | describe | 22.93% | 94.71% |
| 5723 | <what*are | describe | 13.85% | 97.54% |
| 5724 | <what are | describe | 11.41% | 100.00% |
| 1858 | <is | fact | 18.87% | 100.00% |
| 18 | <are | fact | 10.25% | 98.57% |
| 18603 | <what about | followup | 65.52% | 100.00% |
| 18674 | <how about | followup | 18.97% | 100.00% |
| 2898 | <where | location | 67.24% | 100.00% |
| 18877 | <where*i | location | 34.48% | 100.00% |
| 18854 | <where*the | location | 31.03% | 100.00% |
| 18964 | <where*can | location | 28.74% | 100.00% |
| 18965 | <where can | location | 27.01% | 100.00% |
| 18879 | <where*get | location | 15.52% | 100.00% |
| 18863 | <where*is | location | 13.79% | 100.00% |
| 18864 | <where is | location | 13.22% | 100.00% |
| 19339 | <where*find | location | 10.92% | 100.00% |
| 18874 | <where*do | location | 10.34% | 100.00% |

TABLE 4-continued

| Serial #ID | Feature | Label | p(F\|L) | p(L\|F) |
|---|---|---|---|---|
| 9438 | <how*i | method | 47.52% | 93.20% |
| 10598 | <how do | method | 41.58% | 96.55% |
| 20215 | <how can | method | 16.34% | 100.00% |
| 8654 | <how*can | method | 16.34% | 97.06% |
| 11066 | <how*get | method | 14.85% | 96.77% |
| 3289 | <why | reason | 71.70% | 99.13% |
| 21999 | <why*the | reason | 15.72% | 100.00% |
| 22141 | <why*you | reason | 14.47% | 100.00% |
| 21990 | <why*do | reason | 13.84% | 100.00% |
| 21991 | <why do | reason | 12.58% | 100.00% |
| 22024 | <why*is | reason | 10.06% | 100.00% |
| 3485 | <should | should | 68.97% | 100.00% |
| 23419 | <should i | should | 41.38% | 100.00% |
| 23418 | <should*i | should | 41.38% | 100.00% |
| 3518 | <when | time | 64.29% | 100.00% |
| 23658 | <when*i | time | 21.43% | 100.00% |
| 23743 | <when*the | time | 14.29% | 100.00% |
| 23905 | <what if | whatif | 57.14% | 100.00% |
| 23992 | happens AND if | whatif | 25.00% | 100.00% |
| 23991 | happens if | whatif | 25.00% | 100.00% |
| 23990 | happens*if | whatif | 25.00% | 100.00% |
| 23943 | <what*>date | whatif | 21.43% | 100.00% |
| 23937 | <what*file | whatif | 21.43% | 100.00% |
| 23939 | <what*later | whatif | 21.43% | 100.00% |
| 23941 | <what*than | whatif | 21.43% | 100.00% |
| 3544 | >date | whatif | 21.43% | 100.00% |
| 23946 | file AND if | whatif | 21.43% | 100.00% |
| 23962 | file AND later | whatif | 21.43% | 100.00% |
| 23964 | file AND than | whatif | 21.43% | 100.00% |
| 23966 | file AND that | whatif | 21.43% | 100.00% |
| 23967 | file*>date | whatif | 21.43% | 100.00% |
| 23961 | file*later | whatif | 21.43% | 100.00% |
| 23963 | file*than | whatif | 21.43% | 100.00% |
| 23965 | file*that | whatif | 21.43% | 100.00% |
| 23955 | i AND later | whatif | 21.43% | 100.00% |
| 23956 | i*>date | whatif | 21.43% | 100.00% |
| 23954 | i*later | whatif | 21.43% | 100.00% |
| 23949 | if AND later | whatif | 21.43% | 100.00% |
| 23951 | if AND than | whatif | 21.43% | 100.00% |
| 23952 | if*>date | whatif | 21.43% | 100.00% |
| 23945 | if*file | whatif | 21.43% | 100.00% |
| 23948 | if*later | whatif | 21.43% | 100.00% |
| 23950 | if*than | whatif | 21.43% | 100.00% |
| 3543 | later | whatif | 21.43% | 100.00% |
| 23978 | later AND than | whatif | 21.43% | 100.00% |
| 23980 | later AND that | whatif | 21.43% | 100.00% |
| 23977 | later than | whatif | 21.43% | 100.00% |
| 23981 | later*>date | whatif | 21.43% | 100.00% |
| 23976 | later*than | whatif | 21.43% | 100.00% |
| 23979 | later*that | whatif | 21.43% | 100.00% |
| 23984 | than that | whatif | 21.43% | 100.00% |
| 23985 | than*>date | whatif | 21.43% | 100.00% |
| 23983 | than*that | whatif | 21.43% | 100.00% |
| 23988 | that >date | whatif | 21.43% | 100.00% |
| 23987 | that*>date | whatif | 21.43% | 100.00% |
| 991 | <who | who | 75.76% | 97.09% |
| 24246 | <who*is | who | 17.42% | 100.00% |
| 24361 | <who is | who | 15.91% | 100.00% |
| 24254 | <who*the | who | 14.39% | 100.00% |
| 24138 | <who*are | who | 12.88% | 100.00% |
| 24139 | <who are | who | 12.12% | 100.00% |

III. Execution of Gerbil Programs

A. The Internal Structure of a Gerbil Program

Now a more detailed explanation of both the structure and the execution of Gerbil programs in the present embodiment will be given. There are three relevant member variables of the present embodiment of a Gerbil program (CProgram):

| | |
|---|---|
| CExeStruct* | ExeProg; |
| CRunStruct* | RunTime; |
| CMapPtrToPtr | UserRecords; |

The ExeProg contains an executable version of the Gerbil script. The RunTime structure contains variables that are used when executing the Gerbil script. The list of User-Records (stored as a map from UserIDs to CUserRec structures) contains information specific to the state of the conversation with each user, such as any facts remembered about that user and the focus of attention for that conversation.

The CExeStruct contains the following relevant member variables:

| | |
|---|---|
| CCategoryList | PriorityCategories; |
| CCategoryList | DefaultCategories; |
| CCategoryList | SequenceCategories; |
| CCategoryList | StandardCategories; |
| CMapStringToPtr | m_psmpSubjectMap; |

Each CCategoryList contains a list of CCategory objects. Each CCategory contains a set of CConditionActionBlock objects, each with a condition and a list of CAction objects. A CConditionActionBlock is a type of CAction, so CConditionActionBlock objects can recursively contain other CConditionActionBlock objects. A CCategory also contains a list of all the subjects discussed by the category, and a list of pointers to all the other categories that share at least one subject with the category.

The lists PriorityCategories, DefaultCategories, and SequenceCategories are fixed in ordering and are shared among all users. Each user record contains a copy of the list StandardCategories (see below) in which the ordering of categories can dynamically change (according to the focus mechanism). The copy of StandardCategories in the CExeStruct is fixed in order and is used to create the initial copy of StandardCategories for each new user. Finally, the CExeStruct contains a map m_psmpSubjectMap from each subject name to the list of categories that discuss that subject In the present embodiment, the CRunStruct contains two relevant member variables:
CUserRec* User;
CTypedPtrList<CObList, CCategory*>FocusList;

It also contains a number of temporary pointer variables, including Continuation, ActiveCatPos, and SwitchToCategory, which are used in execution as described below. User is a pointer to the user record for the user involved in the current conversation. FocusList is used to store the list of categories that have been activated by the focus of attention mechanism during the current execution of the Gerbil script. It will be used at the end of the run to modify the focus of attention for the current user, as described below.

The CUserRec contains information about the current user and the robot's conversation with the user. In particular, it contains a CMapStringToString containing the contents of the memory for the user, and five member variables relevant to the attention focus mechanism:

| | |
|---|---|
| CCategoryList | AttentionFocus; |
| CTypedPtrList<CObList, CCategory*> | SuppressList; |
| CContinuation* | Continuation; |
| CTypedPtrList<CObList, CContinuation*> | SwitchContinuations; |
| CTypedPtrList<CObList, CContinuation*> | SequenceContinuations; |

AttentionFocus is a copy of the StandardCategories list from the program executable that describes the attention focus for the Bot's conversation with the current user. The order of the categories in this list may be different than the order in StandardCategories, due to the functioning of the focus mechanism. SuppressList is a list of pointers to the categories that are suppressed in the robot's conversation with the current user. SuppressList may include categories from the PriorityCategories, DefaultCategories, and StandardCategories list. Next, Continuation is NULL unless there is a WaitForResponse command that is currently active. In this case, Continuation points to a CContinuation structure that describes where in the script the WaitForResponse is located and how to resume execution from that point. Finally, the user record contains stacks of continuations that handle interruptions of a Sequence category and switches back from Sequence categories. SwitchContinuations contains a CContinuation for each SwitchTo statement for which a SwitchBack is still possible (much like the call stack in other programming languages), while Sequence-Continuations contains a CContinuation for each sequence that has been interrupted by an InterruptSequence command and not yet returned. The functioning of these CContinuation stacks is described further below.

B. The Execution of a Gerbil Program

One main feature of a Gerbil program is its ability to "focus" categories for the express purpose of being more responsive to user communication. The "focusing" of categories, for the purposes of the present invention, is implemented by a combination of explicit and automatic methods. Explicit focusing can currently be accomplished in one of two ways in the current embodiment. The first focus mechanism, the "Focus" command, is added to the script program to explicitly focus a particular category when the command is executed. As will be explained below, "focusing" in the current embodiment moves the focused category to the front of the attention focus list. Thus, during the course of execution, the runtime executive will generally check the newly focused category earlier than it would have had the category not been focused. As an example, a sample Focus command might look like—Focus "dogs", "cats"; —this command would move the category "dogs" to the front of the attention focus list and the category "cats" immediately following it. The Focus command is useful to make certain categories more immediate in the course of conversation and, in particular as to the above example, if the user had recently spoken of "pets".

The second explicit focus mechanism, the "Focus Subjects" command, is similar to the "Focus" command but differs in that it will move a set of unspecified categories, each said category sharing a Subject whereby the Subject is explicitly listed within a "Subjects" command within the category. For example, in scripts example 2 above, the command—Focus Subjects "6SC"; —could be placed in any category and if said command is executed, then all categories explicitly listing "6SC" (i.e. in example 2, these categories are: "Price of 6SC", "Size of 6SC", and "Maker of 6SC") will be placed to the front of the attention focus list. This command is useful to focus related categories without having to explicitly list them all.

In addition to these explicit focus mechanisms, there is an automatic focus mechanism that works without use of explicit commands. If a category is activated by matching an input pattern with a pattern made explicit in a category, or by matching a value of a user memory element with a pattern made explicit in a category, or by executing a statement within the category, then that category is moved to the front of the attention focus list. Additionally, in the current embodiment, if that category contains a Subjects command, then all other categories which share at least one of the arguments of the Subject command are also moved to the front of the attention focus list. It will be appreciated that other protocols could be observed upon automatic focusing of a category.

Another, somewhat related mechanism, "Suppress", is implemented in the current embodiment. "Suppress" is an explicit command that disables the activation of the categories named in the command for the remainder of the course of conversation with that user. Such categories can be placed back into consideration with the use of the "Recover" command. For example, the command—Suppress "dogs"; —will suppress the category "dogs" from further discussion, even if an explicit Focus command would purport to move it to the front of the attention focus list.

Now a more detailed description of the current embodiment will be discussed. During execution, each Gerbil command in the present embodiment actually returns a CABlockEnd value that describes what the program should do following the command. This value is normally Continue, indicating that the program should continue by executing the next Gerbil command. It can also be one of the values Waiting, Done, NextCategory, Switch, SwitchBack, NotActivated, or RunTimeError. (The Done, Continue, and NextTopic "terminators" that appear at the end of a condition block in a Gerbil code are actually implemented as commands that do nothing other than return the appropriate CABlockEnd value.) In this context, the following is a discussion concerning six Gerbil commands that are relevant to the focus of attention mechanism: Focus, Focus Subjects, WaitForResponse, TryAgain, InterruptSequence, and SwitchTo.

Each Focus command in a Gerbil script has as arguments a list of categories. This list is converted by the compiler into a list of pointers to the actual categories. When the Focus command is executed, these pointers are copied to the end of the RunTime->>FocusList structure (to later be brought to the front of the attention focus list.) The C++ code for CFocus::Execute is straightforward and is shown below.

```
POSITION pos = ArgValues.GetHeadPosition();
for(;pos != NULL;) {
    ArgCategory = (ArgValues.GetAt(pos))->Category;
    ArgValues.GetNext(pos);
    if (ArgCategory != NULL) {
        TRACE("Putting Category\"%s\" on focus list\n",
            ArgCategory->Name);
        Context->m_ppProgram->RunTime->FOCUSList.AddTail(
                                        ArgCategory);
    }
}
return Continue;
```

In order to execute a "Focus Subjects" command, the robot executive takes each argument and uses the map m_psmpSubjectMap found in the CExeStruct to determine which categories share that subject. Each of the categories contained in the m_psmpSubjectMap under the subject name is appended to the end of RunTime->>FocusList.

The WaitForResponse command causes execution on the current input to stop, but before that, sets up a CContinuation telling the Gerbil program where to restart when the next input is processed. This CContinuation is created by the compiler and stored in the CWaitForResponse statement. The code for CWaitForResponse::Execute is trivial; it simply copies the CContinuation pointer into RunTime->User->Continuation and returns Waiting. (See the header files for details of the structure of a CContinuation.)

A TryAgain command is simply a special case of WaitForResponse in which the CContinuation starts from the previous WaitForResponse rather than the TryAgain command. A TryAgain command is converted into an appropriate CWaitForResponse by the compiler.

An InterruptSequence command can only be used within a Sequence category, and causes the execution of the category to be suspended while all of the standard and default categories are executed. (InterruptSequence can only be used after a WaitForResponse, to prevent possible conflicts in which a category might be executed twice.) It is implemented by adding a CContinuation to the top of the SequenceContinuations stack (allowing nested interruptions within interruptions) and returning the value NextCategory.

Each SwitchTo command in a Gerbil script has the name of a single category as an argument. Again, this category name is converted into a pointer by the compiler. When the SwitchTo command is executed at run-time, this pointer is copied into a member variable RunTime->SwitchToCategory and the value Switch is returned. Furthermore, a CContinuation representing the SwitchTo is copied into User->>SwitchContinuations so that the category can be resumed if the target category ends with a SwitchBack. The fact that User->SwitchContinuations is a stack allows arbitrarily deep series of SwitchTo and SwitchBack calls.

In order to prevent cycles in which a category in the attention list is repeatedly executed and then SwitchedTo from another category later in the attention list, the present embodiment of the program checks to make sure that the category has not already been executed before returning any value. If it has already been executed, the value RunTimeError is returned instead. (Such cycles can only occur with standard categories. The compiler will check all sequence categories and guarantee that cycles among them will not occur. This is done by viewing each category as a node in a graph and each SwitchTo as an arc, and doing depth-first search to detect cycles in the graph. A WaitForResponse before the SwitchTo eliminates the arc caused by that SwitchTo, as it will prevent cycles from occurring while processing a single input.) The C++ code for CSwitchTo::Execute is shown below. (The SwitchToOneOf command is a straightforward extension of SwitchTo.)

```
CCategory* DestCategory = Destinations[selection]->Category
ASSERT(DestCategory != NULL);
if((DestCategory->Executed) && (DestCategory->Priority != SequencePriority))
{
            // run-time error to switch to an already-executed non-sequence category
            Context->m_ppProgram->PrintTraceMsg("ERROR", SrcFileName, SrcLine);
            return RunTimeError;
}
// record what category is being switched to in the run-time data structure
Context->m_ppProgram->RunTime->SwitchToCategory = DestCategory;
```

```
// and remember where it was called from
Context->m_ppProgram->RunTime->User->SwitchContinuations.AddHead(
        m_pccCallingLocation);
return Switch;
```

The next level of structure above single commands in a Gerbil script is a CConditionActionBlock. A CConditionActionBlock consists of a condition and a body consisting of a list of commands. When the CConditionActionBlock is executed, the condition is first evaluated. If it is false, the block returns NotActivated immediately. Otherwise, the body statements are executed in order (normally starting with the first statement, but starting with a later statement if the block is part of an active Continuation) until one returns a CABlockEnd value other than Continue. When some other CABlockEnd value is returned, it is passed on as the return value of the CConditionActionBlock. (This execution is made slightly more complicated by the use of NotActivated return values to activate only one of a series of IfChance blocks, or to activate Otherwise blocks, but the details of this process are not relevant to the focus of attention mechanism.)

A CCategory contains an ordered list of CConditionActionBlock objects, and is executed by executing the blocks in succession (normally starting with the first block, but starting with a later block if the CCategory is part of an active Continuation.) If a block returns the value NextCategory, Switch, SwitchBack, Waiting, Done, or RunTimeError, execution of the CCategory stops and the return value is passed on. If a block returns NotActivated, the next block is executed. If a block returns Continue, the next block is activated unless it is an Otherwise block or unless both the current and next blocks are IfChance blocks, in which case it and all other IfChance blocks immediately following it are skipped. If the last block in the category returns Continue or NotActivated, execution of the category is complete and the value NextCategory is returned. Meanwhile, if the category is a standard category, any command other than another CConditionActionBlock (or trivial actions such as "Continue") will cause a flag to be set in the category. If this flag is set at the end of CCategory::Run, the category is appended to the end of RunTime->>FocusList so that it will be automatically moved to the front of the focus of attention list. This automatic focus allows the attention focus mechanism to function even without the use of Focus statements. It will be appreciated that other implementations might decide whether a topic should be automatically focused in a different way, for example by automatically focusing on any topic in which the condition in at least one CConditionActionBlock has value true.

This behavior can be overridden by including the command DontFocus in any of the blocks that should not trigger the automatic focus mechanism. Furthermore, if the category is given a list of SUBJECTS in the Gerbil script, when the category is focused using automatic focus, all other categories that share at least one SUBJECT with said category are also appended to the end of RunTime->Focus List and will be automatically moved to the front of the focus of attention list.

When a user enters an input, the function CProgram::Run is called. This function does a number of low-level tasks (such as setting RunTime->User) and then executes the Gerbil program. First, it clears FocusList so that it can keep track of categories that are focused on during the execution. To prevent possible ambiguities in the ordering of category executions, Focusing actions do not have any effect until the script is finished executing on the current input. It will be appreciated that other implementations of an attention focus mechanism might dynamically reorder the attention focus list during the processing of an input.

The CProgram is executed by repeatedly selecting and executing categories, as shown in the code fragment below from CProgram::Run. RunTime->ActivePriority and RunTime->ActiveCatPos are used to keep track of what category is currently being executed. Once execution is complete, RunTime->FocusList is used to move those categories that were activated or focused on during execution to the front of the Focus of Attention, focusing the robot's attention on these categories. The function CProgram::Refocus itself is straightforward, simply going through RunTime->FocusList, and for each element, removing it from its previous position in the attention focus list and placing it at the front of the list.

```
RunTime->FocusList.RemoveAll();
// mark all standard categories as un-executed
ThisUser->AttentionFocus.MarkUndone();
// Execute all of the categories, in order
CABlockEnd ReturnVal = NextCategory;
RunTime->ActivePriority = TopPriority;
RunTime->ActiveCatPos = NULL;
CCategory* ActiveCategory = GetNextCategory(ThisDoc, ThisUser,
                        ExecutionType, ReturnVal);
while (ActiveCategory != NULL) {
        ReturnVal = ActiveCategory->Run(ThisDoc);
        ActiveCategory = GetNextCategory(ThisDoc, ThisUser,
                                        ExecutionType, ReturnVal);
}
// (other tasks done here such as handling output buffers)
// handle all focusing actions
Refocus();
```

Most of the work involved in deciding which categories to execute is done inside of CProgram::GetNextCategory. GetNextCategory uses RunTime->ActivePriority, RunTime->ActiveCatPos, and the ReturnVal from the previous category, and selects the next category to execute. If ReturnVal is NextCategory, the program will simply select the next category from the CategoryList for the current ActivePriority (Priority, Standard, or Default), switching to the next priority level if necessary. (Recall that the Priority and Default categories are found in the CExeStruct, while the standard categories are found in RunTime->User->AttentionFocus. Sequence categories are never executed unless activated with a SwitchTo command, so the list ExeProg->SequenceCategories is never executed directly.) If there is an active CContinuation remaining from a previous execution (due to a WaitForResponse), it is activated immediately after the Priority categories. CContinuations are activated by returning the appropriate category and setting RunTime->Continuation, which will cause execution of the category to begin at the appropriate place within the category rather than the beginning.

If ReturnVal is Switch, the target category (from RunTime->SwitchToCategory) is selected, and if the target category is a Standard category, RunTime->ActiveCatPos is set as well. If ReturnVal is SwitchBack, the first CContinuation from SwitchContinuations is removed from the stack and used to choose a category and set up a continuation. (Since SwitchBack can only be used within a Sequence category, there is guaranteed to be at least one continuation in SwitchContinuations. The process is equivalent to the method of returning from a subroutine in other programming languages.) If ReturnVal is Waiting, execution ceases since a WaitForResponse has been executed. Similarly, if ReturnVal is RunTimeError, execution ceases and the stack of SwitchContinuations and SequenceContinuations is cleared. (RunTimeError is presently returned only in the event of a SwitchTo cycle violation.) Finally, if ReturnVal is Done (recall that a category cannot return value NotActivated or Continue), execution stops unless there was an InterruptSequence that has not yet been resumed. Recall that InterruptSequence stops execution of a Sequence category while all of the Standard and Default categories are executed, and then resumes execution of the Sequence category. Therefore, if a Done is reached while there is at least one CContinuation in the SequenceContinuations stack, that Sequence category is resumed. In the case where there is no SequenceContinuation, the SwitchContinuations stack can also be cleared, as there is no possibility of returning from any SwitchTo statements once a Done (that is not ending an interruption) is executed.

IV. Examples of Automatic Attention Focusing

Having described the architecture of a present embodiment, the operation of the present invention will now be illustrated by describing the execution of the two example script programs, listed above in Table 1. For the purposes of illustration, assume that a site visitor engages in the following discussion with a site that has implemented script example 1:

Transcript of Interaction with Robot Incorporating Script Example 1:
Console Says: hello
Robot Says: Would you like to know about Cats or Computers?
Console Says: cats
Robot Says: What would you like to know about my cat?
Console Says: has it ever caught a mouse
Robot Says: It caught a mouse once and brought it
Robot Says: to me as a present
Console Says: tell me about computers
Robot Says: What would you like to know about my computer?
Console Says: does it have a mouse
Robot Says: The mouse is a PS/2 type mouse with three buttons
Robot Says: Would you like to buy one?
Console Says: Yes
Robot Says: OK, what is your name?
Console Says: Aloysius
Robot Says: That will be $199.95
Robot Says: Please enter you credit card number now
Console Says: 3333 3333 3333 3333
Robot Says: OK, We'll mail one to you within two weeks
Robot Says: Please give me your mailing address now.
Console Says: Fudge. That's too late
Robot Says: I'm sorry, that kind of language is not permitted here (user is kicked off system)
Execution of the Sample Gerbil Script Example 1:

The Gerbil Script given in Example 1 contains 6 categories: one priority topic, one sequence topic, and four standard topics. The priority topic, "Swearing Filter", is placed in ExeProg->PriorityCategories; the sequence topic, "Mouse Sales", is placed in ExeProg->SequenceCategories, and the four other topics are placed in ExeProg–>>StandardCategories, in the order in which they appear in the script. Once the user begins talking to the robot, the categories in ExeProg->StandardCategories are copied to the AttentionFocus field of the CUserRec for the user. It is assumed here that the same user is talking to the robot throughout this example.

In the remainder of this example, the "focus of attention" is referred to as the list of all of the topics, in the order in which they are executed. (Note that this should not be confused with the AttentionFocus member variable of a CUserRec.) The initial focus of attention for this user is as follows (the position of "Mouse Sales" is arbitrary since it is not executed unless specifically activated.)

| Topic | Type | Where It Is |
|---|---|---|
| Swearing Filter | Priority | ExeProg->PriorityCategories |
| CatsOrComputers | Standard | RunTime->User->AttentionFocus |
| Cats | Standard | RunTime->User->AttentionFocus |
| Computers | Standard | RunTime->User->AttentionFocus |
| Unknown Input | Standard | RunTime->User->AttentionFocus |
| (Mouse Sales) | (Sequence) | ExeProg->SequenceCategories |

>Console Says: hello
>Robot Says: Would you like to know about Cats or Computers?

The program begins by executing the categories in ExeProg->PriorityCategories. This list contains only one topic, "Swearing Filter." The condition in the IfHeard statement in the topic does not hold, so the commands in the body are not executed, and the topic returns the CABlockEnd value NextCategory. Next, it begins executing the categories in RunTime->User->AttentionFocus. First, it executes the topic "CatsOrComputers". The input contains neither "cat" nor "computer", so the If block is not executed and the topic returns NextCategory. Similarly, no condition blocks in the topics "Cats" or "Computers" have conditions that are true for this input, so NextCategory is returned for each. Finally, it executes the topic "Unknown Input". The condition If?WhatUserSaid DoesNotContain "cat", "computer", "mouse", "it" holds, so the body of the block is executed and the robot says "Would you like to know about cats or computers?" Since a statement in the category was executed, a pointer to the category is added to RunTime->FocusList. Finally, the block returns Done, and the category thus returns Done. There are no more topics to execute (if there were, they would not be executed now because ReturnVal is set to Done), and no active SequenceContinuations, so CProgram::Refocus is executed and the topic "Unknown Input" is moved to the front of RunTime->User->AttentionFocus and the run is complete.

The focus of attention is now as follows:

| Topic | Type | Where It Is |
|---|---|---|
| Swearing Filter | Priority | ExeProg->PriorityCategories |
| Unknown Input | Standard | RunTime->User->AttentionFocus |
| CatsOrComputers | Standard | RunTime->User->AttentionFocus |
| Cats | Standard | RunTime->User->AttentionFocus |
| Computers | Standard | RunTime->User->AttentionFocus |
| (Mouse Sales) | (Sequence) | ExeProg->SequenceCategories |

\>Console Says: cats
\>Robot Says: What would you like to know about my cat?

Again, the priority topic "Swearing Filter" is executed and has no effect. Next, the topic "Unknown Input" is executed. The DoesNotContain condition does not hold, so the topic has no effect and returns NextCategory. Now, the topic "CatsOrComputers" is executed. The first condition
    IfHeard "cat", "computer"
is true, as is the condition on the first block inside of it,
    IfHeard "cat"
Thus the robot says "What would you like to know about my cat?" and executes the command Focus "Cats". When it executes this Focus command, a pointer to the topic "Cats" is added to RunTime->FocusList. (Note that RunTime->FocusList was empty, since it is cleared at the beginning of each call to CProgram::Run.) Finally, the block returns Done. Since ReturnVal is now Done, the next block in the "CatsOrComputers" topic is not executed. Finally, since a statement within "CatsOrComputers" has been executed, the topic is auto-focused by adding a pointer to the topic to the end of RunTime->FocusList. Since ReturnVal is Done, no further categories are executed, and the program calls CProgram::Refocus, which moves the two topics "Cats" and "CatsOrComputers" to the front of the attention focus list for this user. The focus of attention is now as follows:

| Topic | Type | Where It Is |
| --- | --- | --- |
| Swearing Filter | Priority | ExeProg->PriorityCategories |
| Cats | Standard | RunTime->User->AttentionFocus |
| CatsOrComputers | Standard | RunTime->User->AttentionFocus |
| Unknown Input | Standard | RunTime->User->AttentionFocus |
| Computers | Standard | RunTime->User->AttentionFocus |
| (Mouse Sales) | (Sequence) | ExeProg->SequenceCategories |

\>Console Says: has it ever caught a mouse
\>Robot Says: It caught a mouse once and brought it
\>Robot Says: to me as a present Again, the priority topic "Swearing Filter" is executed and has no effect. The program now executes topic "Cats" as it is the first topic in AttentionFocus for this user. The outer IfHeard condition is true since the input contains both "it" and "mouse". Thus, the robot says "It caught a mouse once and brought it to me as a present." Since a command within "Cats" was executed, a pointer to "Cats" is put in RunTime->FocusList. The inner block returns Done, so no further blocks or topics are executed. CProgram::Refocus is now executed, but since "Cats"is already at the front of AttentionFocus, the order of the topics in the focus of attention is unchanged.

\>Console Says: tell me about computers
\>Robot Says: What would you like to know about my computer?

The topics "Swearing Filter" and "Cats" are both executed with no effect. The program now executes topic "CatsOrComputers", and the if block with condition
    IfHeard "computer"
is executed. The robot thus asks "What would you like to know about my computer?"and executes the Focus statement, which puts a pointer to "Computers" in RunTime->FocusList. Since the topic "CatsOrComputers" was activated, a pointer to it is also placed in RunTime->FocusList, after the pointer to "Computers". Since the block ends with a Done, the value Done is returned and execution stops. The two topics "Computers" and "CatsOrComputers" are now moved to the front of AttentionFocus for the user, and the focus of attention is now as follows:

| Topic | Type | Where It Is |
| --- | --- | --- |
| Swearing Filter | Priority | ExeProg->PriorityCategories |
| Computers | Standard | RunTime->User->AttentionFocus |
| CatsOrComputers | Standard | RunTime->User->AttentionFocus |
| Cats | Standard | RunTime->User->AttentionFocus |
| Unknown Inputs | Standard | RunTime->User->AttentionFocus |
| (Mouse Sales) | (Sequence) | ExeProg->SequenceCategories |

\>Console Says: does it have a mouse
\>Robot Says: The mouse is a PS/2 type mouse with three buttons
\>Robot Says: Would you like to buy one?

After executing "Swearing Filter" without effect, it begins AttentionFocus, starting with the topic "Computers". Both IfHeard conditions are true, since the input contains both "it" and "mouse". Thus, the robot says "The mouse is a PS/2 type mouse with three buttons." The SwitchTo statement is now executed. After checking that "Mouse Sales" has not already been executed, it sets RunTime->SwitchToCategory to point to "Mouse Sales" and returns the CABlockEnd value Switch (it also adds a continuation to RunTime->User->SwitchContinuations, but since "Mouse Sales" does not contain a SwitchBack command, this continuation never gets used.) Thus, on the next iteration, GetNextCategory returns "Mouse Sales" (it would also have moved Run Time->ActiveCatPos if "Mouse Sales" had not been a Sequence topic.) The execution of "Mouse Sales" begins by saying "Would you like to buy one?" and then executing the WaitForResponse command. The WaitForResponse command stores a CContinuation pointing to the following statement into RunTime->User->Continuation and returns the value Waiting, stopping execution. Meanwhile, the topic "Computers" was added to RunTime->FocusList but Refocus has no effect since "Computers" is already at the start of RunTime->User->AttentionFocus. The topic "Mouse Sales" is not a standard topic and therefore is not ever added to RunTime->FocusList.

The focus of attention can now be viewed as follows. Note that "Mouse Sales" is placed immediately below "Swearing Filter" since, due to the active CContinuation, it will be executed before any of the topics in RunTime->User->AttentionFocus.

| Topic | Type | Where It Is |
| --- | --- | --- |
| Swearing Filter | Priority | ExeProg->PriorityCategories |
| Mouse Sales | Sequence | RunTime->User->Continuation |
| Computers | Standard | RunTime->User->AttentionFocus |
| CatsOrComputers | Standard | RunTime->User->AttentionFocus |
| Cats | Standard | RunTime->User->AttentionFocus |
| Unknown Inputs | Standard | RunTime->User->AttentionFocus |

\>Console Says: Yes
\>Robot Says: OK, what is your name?

After executing "Swearing Filter" with no effect, the robot checks to see if there is an active continuation. Since there is, it sets RunTime->Continuation, and now checks to see if the continuation is from a sequence topic. Since it is, GetNextCategory selects "Mouse Sales" before any of the categories in RunTime->User->AttentionFocus. Execution resumes immediately following the first WaitForResponse (the category checks RunTime->Continuation to see where within its body to begin executing; if RunTime-> Continuation were NULL, it would begin with the first block.) Thus, the robot checks that it didn't just hear "no", and says "OK, what is your name?", then executes WaitForResponse, which sets up another CContinuation in RunTime->User→>Continuation and returns Waiting, ending execution. In this execution, nothing was added to RunTime->FocusList so no refocusing is done. The focus of attention is identical to that shown after the previous input.
>Console Says: Aloysius
>Robot Says: That will be $199.95
>Robot Says: Please enter you credit card number now
>Console Says:3333 3333 3333 3333
>Robot Says: OK, We'll mail one to you within two weeks
>Robot Says: Please give me your mailing address now.

The processing of the next two inputs is identical to the processing of the "yes" earlier, and since the continuations remain within "Mouse Sales", the focus of attention remains the same.
>Console Says: Fudge. That's too late
>Robot Says: I'm sorry, that kind of language is not permitted here
>(user is kicked off system)

As usual, the program begins by executing "Swearing Filter". Since the input contains the word "fudge", the condition in "Swearing Filter" is executed, and the robot says "I'm sorry, that kind of language is not permitted here" and executes the Do command that kicks the user off the system. Since this topic returns Done, CProgram::Run sets ReturnVal to Done, and the CContinuation of "Mouse Sales" is not copied into RunTime->Continuation and thus not executed on this run.

Transcript of Interaction with Robot Incorporating Script Example 2:
Console Says: How big is the 6SC?
Robot Says: The 6SC monitor has a 19 inch full-color screen
Console Says: How much is it?
Robot Says: The 6SC monitor is now available for $899
Console Says: What about the 5SG?
Robot Says: The 5SG monitor is now available for $499
Console Says: How big is its screen?
Robot Says: The 5SG monitor has a 14 inch grayscale screen
Console Says: Who makes it?
Robot Says: The 5SG monitor is made by MonitorTech
Console Says: What about the XV17?
Robot Says: The XV17 monitor is made by NEC The auto-focus mechanism that is used to automatically bring categories to the front of the robot's focus of attention can be supplemented by specifying one or more "subjects" for a topic. If subjects are specified for a category C, when C is executed, it will be brought to the front of the focus of attention, and all other categories that share at least one subject with category C will also be brought to the front of the focus of attention. This mechanism allows for the automatic execution of behavior that could otherwise only be generated by an explicit "Focus"statement in the Gerbil script listing all of the categories that cover similar subjects.

The subject-based auto-focus mechanism is useful for handling pronouns (as in the use of "it"in the sample transcript) and answering context-dependent questions (such as the questions "What about the 5SG?" and "What about the XV17?" in the sample transcript.)

Subject specifications are included in categories as a CStringArray of subject names. The compiler produces a CMapStringToPtr that maps each subject name to a pointer to a CCategoryList that contains all the categories associated with that subject name. The compiler then uses this map to set up a list of CCategory pointers for each category C that describes all categories that share at least one subject with C. When the category C is executed, all the pointers in this list are added to RunTime->FocusList and will be moved to the front of the focus of attention at the end of execution. The CExeStruct also contains a CMapStringToPtr(m_psmpSubjectMap) that maps subject names to categories, for use in executing a "Focus Subjects" command.

Execution of the Sample Gerbil Script Example 2:

As with the first example, it is assumed that this interaction occurs between the robot and a single user. The details of the execution of each topic for each input are the same as in the first example, with the exceptions noted in the previous section. Since this script contains only standard topics, all of the topics are in:

RunTime->User->AttentionFocus.

Therefore, our diagrams of the robot's focus of attention for this example will only show the ordering of the topics within RunTime->User->AttentionFocus, not the location or type of the topics. For convenience, our diagrams also show the list of subjects associated with each topic.

The initial ordering of the topics is exactly as found in the Gerbil script:

| Topic | Subjects |
| --- | --- |
| Price of XV17 | "XV17", "cost" |
| Size of XV17 | "XV17", "features" |
| Maker of XV17 | "XV17", "maker" |
| Price of 5SG | "5SG", "cost" |
| Size of 5SG | "5SG", "features" |
| Maker of 5SG | "5SG", "maker" |
| Price of 6SC | "6SC", "cost" |
| Size of 6SC | "6SC", "features" |
| Maker of 6SC | "6SC", "maker" |

>Console Says: How big is the 6SC?
>Robot Says: The 6SC monitor has a 19 inch full-color screen The input does not contain "XV 17", "5SG", or a word beginning with "it" (the "$it" pattern matches any word beginning with the letters "it", such as "it" or "it's".) Therefore, none of the first six topics are activated. In the seventh topic, "Price of 6SC", the outer IF block is activated because "6SC" was heard, but the inner IF block is not activated, so the topic returns NextCategory. Since no statement was executed in the topic other than the IF conditions, the flag in the topic indicating activation is not set, and nothing is added to FocusList. Finally, in the eighth topic, "Size of 6SC", the conditions of both the outer and the inner IF block are true, so the robot says "The 6SC monitor has a 19 inch full-color screen". This inner clause returns Done, so execution is complete. However, this statement also sets the activation flag in the topic, so that when the topic is completed, the topic is added to the front of RunTime->FocusList. Since the topic also has two subjects associated with it ("6SC" and "features"), all other topics associated with these topics are also added to RunTime->FocusList. The two other "6SC" topics, "Price of 6SC" and "Maker of 6SC" are the added first, followed by the two other "features" topics "Size of XV17" and "Size of 5SG". (The order is consistent with the order in which the topics were originally defined.) Once execution is complete, the topics in RunTime->FocusList are moved to the front of RunTime->User→>AttentionFocus, producing the focus of attention described below:

| Topic | Subjects |
|---|---|
| Size of 6SC | "6SC", "features" |
| Price of 6SC | "6SC", "cost" |
| Maker of 6SC | "6SC", "maker" |
| Size of XV17 | "XV17", "features" |
| Size of 5SG | "5SG", "features" |
| Price of XV17 | "XV17", "cost" |
| Maker of XV17 | "XV17", "maker" |
| Price of 5SG | "5SG", "cost" |
| Maker of 5SG | "5SG", "maker" |

>Console Says: How much is it?
>Robot Says: The 6SC monitor is now available for $899

The topic "Size of 6SC" is executed first. The outer IF condition is true, as the input contains the word "it", but the inner IF statement is not activated. Since no non-IF statement was executed, the topic returns NextCategory and nothing is added to RunTime->FocusList. Next, the topic "Price of 6SC" is activated. The outer IF condition is true since the input contains "it", and the inner IF condition is true since the input contains "how much". Therefore, the robot "knows" that the question is referring to the 6SC monitor, despite the fact that the user's question does not mention the type of monitor. It thus says "The 6SC monitor is now available for $899", and the topic returns Done. (Note that the topics "Price of XV17" and "Price of 5SG" would also be activated by the same input, but since they are lower on the attention stack, they are not executed at this time.) Since a statement within the topic was executed, the topic is added to RunTime->FocusList. Since it has two subjects "6SC" and "cost", the other two topics with subject "6SC" and the other two topics with subject "cost" are also added to RunTime->FocusList. Execution of the script for this input is now finished, so the topics in FocusList are moved to the front of the focus of attention, producing the following focus:

| Topic | Subjects |
|---|---|
| Price of 6SC | "6SC", "cost" |
| Size of 6SC | "6SC", "features" |
| Maker of 6SC | "6SC", "maker" |
| Price of XV17 | "XV17", "cost" |
| Price of 5SG | "5SG", "cost" |
| Size of XV17 | "XV17", "features" |
| Size of 5SG | "5SG", "features" |
| Maker of XV17 | "XV17", "maker" |
| Maker of 5SG | "5SG", "maker" |

>Console Says: What about the 5SG?
>Robot Says: The 5SG monitor is now available for $499

The first three topics in the focus of attention are not activated, as the input does not contain "6SC" or a word beginning with "it". Similarly, "Price of XV17" is not activated. The next topic executed is "Price of 5SG". The outer IF condition is true because the input contains "5SG", while the inner IF condition is true because the input contains "what about". Therefore, the robot "knows" that, given the previous conversation, the user is asking about the price of the monitor despite the fact that the user's question said nothing about price. It thus says "The 5SG monitor is now available for $499" and returns the value Done. As was done in the other case, the topic "Price of 5SG" is added to RunTime->FocusList, as are the four other topics associated with the subjects "5SG" and "cost". These subjects are moved to the front of the focus of attention, producing the following:

| Topic | Subjects |
|---|---|
| Price of 5SG | "5SG", "cost" |
| Size of 5SG | "5SG", "features" |
| Maker of 5SG | "5SG", "maker" |
| Price of XV17 | "XV17", "cost" |
| Price of 6SC | "6SC", "cost" |
| Size of 6SC | "6SC", "features" |
| Maker of 6SC | "6SC", "maker" |
| Size of XV17 | "XV17", "features" |
| Maker of XV17 | "XV17", "maker" |

>Console Says: How big is its screen?
>Robot Says: The 5SG monitor has a 14 inch grayscale screen The outer IF condition in the first topic "Price of 5SG" is true because the input contains the word "its", but the inner condition is not true, so the topic is not activated. In the next topic, "Size of 5SG", the outer IF condition is true because the input contains "its" while the inner IF condition is true because the input contains "how big". Thus, the robot knows that "its" refers to the 5SG monitor (recall that in a previous input, "it" was correctly interpreted as referring to the 6SC monitor instead.) Therefore, the robot answers the question correctly and moves the topic "Size of 5SG" to the front of the attention focus, followed by the other two topics with subject "5SG" and the other two topics with subject "features". The new focus of attention is as follows:

| Topic | Subjects |
|---|---|
| Size of 5SG | "5SG", "features" |
| Price of 5SG | "5SG", "cost" |
| Maker of 5SG | "5SG", "maker" |
| Size of XV17 | "XV17", "features" |
| Size of 6SC | "6SC", "features" |
| Price of XV17 | "XV17", "cost" |
| Price of 6SC | "6SC", "cost" |
| Maker of 6SC | "6SC", "maker" |
| Maker of XV17 | "XV17", "maker" |

>Console Says: Who makes it?
>Robot Says: The 5SG monitor is made by MonitorTech The next statement is processed similarly, as the combination of "it" and "who makes" activates the third topic "Maker of 5SG" and produces the correct answer. The topic "Maker of 5SG" is moved to the front of the focus of attention, again followed by the other two "5SG" topics and the other two "maker" topics. The new focus of attention is as follows:

| Topic | Subjects |
|---|---|
| Maker of 5SG | "5SG", "maker" |
| Price of 5SG | "5SG", "cost" |
| Size of 5SG | "5SG", "features" |
| Maker of XV17 | "XV17", "maker" |
| Maker of 6SC | "6SC", "maker" |
| Size of XV17 | "XV17", "features" |
| Size of 6SC | "6SC", "features" |
| Price of XV17 | "XV17", "cost" |
| Price of 6SC | "6SC", "cost" |

>Console Says: What about the XV17?
>Robot Says: The XV17 monitor is made by NEC None of the first three topics are activated, as the input does not contain either "5SG" or any word beginning with "it". In the next topic, "Maker of XV17", the outer condition is activated because the input contains "XV17", while the inner condition is activated because the input contains "what about". Therefore, the robot answers the question by giving the maker of the XV17. (Recall that the previous "What about" question was correctly interpreted as referring to the price of the monitor, while this is correctly interpreted as referring to the maker of the monitor.) Once again, the topic "Maker of XV17" is moved to the front of the attention list, followed by the four other topics that share at least one subject with the topic "Maker of XV17". The final focus of attention is as follows:

| Topic | Subjects |
| --- | --- |
| Maker of XV17 | "XV17", "maker" |
| Price of XV17 | "XV17", "cost" |
| Size of XV17 | "XV17", "features" |
| Maker of 5SG | "5SG", "maker" |
| Maker of 6SC | "6SC", "maker" |
| Price of 5SG | "5SG", "cost" |
| Size of 5SG | "5SG", "features" |
| Size of 6SC | "6SC", "features" |
| Price of 6SC | "6SC", "cost" |

It has thus been shown in this specification various methods and mechanisms for focusing the attention of a BOT while interacting with a human user. It will be appreciated that various other embodiments of the present invention are possible and known to those skilled in the art and that the scope of the present invention includes such other embodiments.

What is claimed is:

1. In an automated interface program designed to interact and communicate with users, said program executing actions when a category among a set of predefined categories is activated, a method for focusing the attention of the automated interface progam, the steps of said method comprising:
    defining a list of categories activatable by said program;
    maintaining an attention focus list, said focus list comprising an ordered list of categories;
    executing actions associated with categories that are activated;
    re-ordering said attention focus list during the course of interaction, said re-ordering being dependent upon which categories were activated.

2. The method of claim 1 further comprising:
    receiving input from a user;
    examining a category in the list of categories; and
    when the received input matches the examined category, activating the examined category.

3. The method of claim 2, wherein a category includes a condition, and wherein the examined category is activated when the condition of the examined category matches the received input.

4. The method of claim 2, wherein defining a list of categories comprises:
    defining a priority category type; and
    defining a standard category type,
    wherein in category in the priority category type is examined before any category in the standard category type.

5. The method of claim 4, wherein defining a list of categories further comprises:
    defining a default category type, wherein a category in the default category type is examined after any category in the standard category type.

6. The method of claim 4, wherein defining a list of categories comprises:
    defining a sequence category type, wherein a category in the sequence category type is examined only when a request to examine the request category is executed in association with another category.

7. The method of claim 2, wherein when the received input does not match the examined category, examining another category in the list of categories, and wherein categories in the list of categories are examined in an order corresponding to the ordered list of categories.

8. The meted of claim 1, wherein re-ordering said attention focus list comprises:
    moving a category in the ordered list of categories to a position of higher precedence when the category has been activated.

9. The method of claim 8, wherein the categories have subject commands with arguments and moving a category comprises:
    moving a set of categories in the ordered list of categories to a position of higher precedent when one or more arguments in the subject commands of the categories in the set of categories match at least one of the arguments of the subject command of the category that has been activated.

10. The method of claim 1, wherein re-ordering said attention focus list comprises:
    moving a category in the ordered list of categories to a position of higher precedence in response to a focus command.

11. The method of claim 10, wherein the focus command identifies the category to be moved.

12. The method of claim 10, wherein the focus command identifies a subject, wherein the categories have subject commands, and moving a category comprises:
    moving a set of categories in the ordered list of categories to a position of higher precedent when the subject commands of the categories in the set of categories match the subject identified by the focus command.

13. A system for automatically focusing the attention of an automated interface program designed to interact and communicate with users, said program executing actions when a category among a set of predefined categories is activated, said system comprising:
    an interface for receiving input from a user;
    a memory device having:
        categories activatable by said program, and
        an attention focus list, the focus list comprising an ordered list of categories; and
    a processor configured to:
        receiving input from the interface,
        examine a category,
        when a received input matches the examined category, activate the examined category, and
        execute actions associated with the activated category, and
    re-order the attention focus list during the course of interaction, the re-ordering being dependent upon which categories were activated.

14. The system of claim 13, wherein the categories comprises:
- a priority category type; and
- a standard category type,
- wherein the processor examines a category in the priority category type before any category in the standard category type.

15. The system of claim 14, wherein the categories further comprises:
- a default category type, wherein the processor examines a category in the default category type after any category in the standard category type.

16. The system of claim 14, wherein the categories further comprises:
- a sequence category type, wherein the processor examines a category in the sequence category type only when a request to examine the request category is executed in association with another category.

17. The system of claim 13, wherein when the received input does not match the examined category, the processor examines another category in the list of categories, and wherein categories in the list of categories are examined in an order corresponding to the ordered list of categories.

18. The system of claim 13, wherein the processor re-orders the attention focus list by:
- moving a category in the ordered list of categories to a position of higher precedence when the category has been activated.

19. The system of claim 18, wherein the categories have subject commands with arguments, and moving a category comprises:
- moving a set of categories in the ordered list of categories to a position of higher precedent when one or more arguments in the subject commands of the categories in the set of categories match at least one of the arguments of the subject command of the category that has been activated.

20. The system of claim 13, wherein the processor re-orders the attention focus list by:
- moving a category in the ordered list of categories to a position of higher precedence in response to a focus command.

21. The system of claim 20, wherein the focus command identifies the category to be moved.

22. The system of claim 20, wherein the focus command identifies a subject, wherein the categories have subject commands, and moving a category comprises:
- moving a set of categories in the ordered list of categories to a position of higher precedent when the subject commands of the categories in the set of categories match the subject identified by the focus command.

23. A computer-readable storage medium containing computer executable code to focus the attention of an automated interface program designed to interact and communicate with users providing user input by instructing a computer to operate as follows:
- defining a list of categories activatable by said program;
- maintaining an attention focus list, said focus list comprising an ordered list of categories;
- executing actions associated with categories that are activated;
- re-ordering said attention focus list during the course of interaction, said re-ordering being dependent upon which categories were activated.

24. The computer-readable storage medium of claim 23 further comprising:
- receiving input from a user;
- examining a category in the list of categories; and
- when the received input matches the examined category, activating the examined category.

25. The computer-readable storage medium of claim 24, wherein a category includes a condition, and wherein the examined category is activated when the condition of the examined category matches the received input.

26. The computer-readable storage medium of claim 24, wherein defining a list of categories comprises:
- defining a priority category type; and
- defining a standard category type,
- wherein a category in the priority category type is examined before any category in the standard category type.

27. The computer-readable storage medium of claim 26, wherein defining a list of categories further comprises:
- defining a default category type, wherein a category in the default category type is examined after any category in the standard category type.

28. The computer-readable storage medium of claim 26, wherein defining a list of categories comprises:
- defining a sequence category type, wherein a category in the sequence category type is examined only when a request to examine the request category is executed in association with another category.

29. The computer-readable storage medium of claim 24, wherein when the received input does not match the examined category, examining another category in the list of categories, and wherein categories in the list of categories are examined in an order corresponding to the ordered list of categories.

30. The computer-readable storage medium of claim 23, wherein re-ordering said attention focus list comprises:
- moving a category in the ordered list of categories to a position of higher precedence when the category has been activated.

31. The computer-readable storage medium of claim 30, wherein the categories have subject commands with arguments, and moving a category comprises:
- moving a set of categories in the ordered list of categories to a position of higher precedent when one or more arguments in the subject commands of the categories in the set of categories match at least one of the arguments of the subject command of the category that has been activated.

32. The computer-readable storage medium of claim 23, wherein re-ordering said attention focus list comprises:
- moving a category in the ordered list of categories to a position of higher precedence in response to a focus command.

33. The computer-readable storage medium of claim 32, wherein the focus command identifies the category to be moved.

34. The computer-readable storage medium of claim 32, wherein the focus command identifies a subject, wherein the categories have subject commands, and moving a category comprises:
- moving a set of categories in the ordered list of categories to a position of higher precedent when the subject commands of the categories in the set of categories match the subject identified by the focus command.

* * * * *